United States Patent
Dai et al.

(10) Patent No.: US 10,887,777 B2
(45) Date of Patent: Jan. 5, 2021

(54) METHOD AND DEVICE FOR DATA TRANSMISSION IN WIRELESS COMMUNICATION NETWORK

(71) Applicant: ZTE CORPORATION, Shenzhen (CN)

(72) Inventors: Qian Dai, Shenzhen (CN); Shuqiang Xia, Shenzhen (CN)

(73) Assignee: ZTE CORPORATION ( * ) Notice: Subject to any disclaimer, the term of this patent is extended or adjusted under 35 U.S.C. 154(b) by 256 days.

(21) Appl. No.: 15/541,030

(22) PCT Filed: Jul. 22, 2015

(86) PCT No.: PCT/CN2015/084836
§ 371 (c)(1),
(2) Date: Jun. 30, 2017

(87) PCT Pub. No.: WO2016/107153
PCT Pub. Date: Jul. 7, 2016

(65) Prior Publication Data
US 2017/0359738 A1 Dec. 14, 2017

(30) Foreign Application Priority Data
Dec. 30, 2014 (CN) .......................... 2014 1 0843614

(51) Int. Cl.
H04W 24/02 (2009.01)
H04W 4/18 (2009.01)
H04L 29/08 (2006.01)
H04W 4/70 (2018.01)

(52) U.S. Cl.
CPC ............. *H04W 24/02* (2013.01); *H04L 67/32* (2013.01); *H04W 4/18* (2013.01); *H04W 4/70* (2018.02)

(58) Field of Classification Search
CPC .......... H04W 4/18; H04W 24/02; H04L 67/32
See application file for complete search history.

(56) References Cited

U.S. PATENT DOCUMENTS

| 2003/0123485 | A1  | 7/2003  | Yi et al. |
| 2009/0016342 | A1  | 1/2009  | Miyazaki et al. |
| 2012/0027126 | A1* | 2/2012  | Park ..................... H04L 27/2604 375/298 |
| 2012/0327888 | A1* | 12/2012 | Sankar .................. H04L 5/0053 370/329 |
| 2014/0078909 | A1* | 3/2014  | Sambhwani ...... H04W 52/0238 370/252 |
| 2017/0163945 | A1* | 6/2017  | Oh .......................... H04N 7/52 |

FOREIGN PATENT DOCUMENTS

| CN | 101159677 A | 4/2008 |
| CN | 102624605 A | 8/2012 |
| CN | 103209062 A | 7/2013 |
| CN | 103701865 A | 4/2014 |
| CN | 103841616 A | 6/2014 |

* cited by examiner

Primary Examiner — Rhonda L Murphy
(74) Attorney, Agent, or Firm — McDonald Hopkins LLC

(57) ABSTRACT

A method and device for data transmission in a wireless communication network are disclosed. The method includes that: a data regularity of data in a transmitted data packet is acquired; a subsequent sending manner and corresponding receiving manner for the data having the data regularity are determined; and the data having the data regularity is sent according to the determined sending manner.

12 Claims, 7 Drawing Sheets

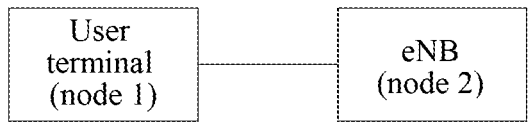

FIG. 1

```
┌─────────────────────────────────────────────────────────────────┐
│ A terminal makes statistics on data sent by itself; since       │
│ output of an infrared moving object sensor has an undiversified │
│ and relatively high repetition probability, both two types of   │ 201
│ output values of the infrared moving object sensor may be      │
│ included in optimizable data and belong to a first type of      │
│ optimizable data                                                │
└─────────────────────────────────────────────────────────────────┘
                                │
                                ▼
┌─────────────────────────────────────────────────────────────────┐
│ The terminal sends its own optimizable data information to an   │ 202
│ eNB                                                             │
└─────────────────────────────────────────────────────────────────┘
                                │
                                ▼
┌─────────────────────────────────────────────────────────────────┐
│ The terminal determines to select a second sending and          │
│ receiving rule according to the type of its own optimizable     │ 203
│ data, and the terminal notifies the eNB of an allocated         │
│ temporary replacement code                                      │
└─────────────────────────────────────────────────────────────────┘
                                │
                                ▼
┌─────────────────────────────────────────────────────────────────┐
│ The eNB configures a dedicated data channel for the terminal    │ 204
│ for sending the temporary replacement code                      │
└─────────────────────────────────────────────────────────────────┘
                                │
                                ▼
┌─────────────────────────────────────────────────────────────────┐
│ The terminal senses, and periodically sends the sensed output   │
│ data to the eNB, and the output data is replaced with the       │ 205
│ temporary replacement code                                      │
└─────────────────────────────────────────────────────────────────┘
                                │
                                ▼
┌─────────────────────────────────────────────────────────────────┐
│ The eNB, after receiving the replacement code, replaces the     │
│ temporary replacement code with the optimizable data            │ 206
│ corresponding to the temporary replacement code                 │
└─────────────────────────────────────────────────────────────────┘
```

FIG. 2

METHOD AND DEVICE FOR DATA TRANSMISSION IN WIRELESS COMMUNICATION NETWORK

TECHNICAL FIELD

The present disclosure relates to the field of communications, and particularly to a method and device for data transmission in a wireless communication network.

BACKGROUND

In a data communication network in a related technology, transmission for a piece of data is required to be over multiple transmission nodes, and a transmission carrier or transmission channel dedicated to a data transmitter and receiver is required to be established between every two adjacent transmission nodes. The network may maintain the transmission channel when the data transmission is relatively frequent, and the network may release the transmission channel when the data transmission is not frequent. When a sending end is required to send new data, the network re-establishes a transmission channel to transmit the new data according to a request of the sending end. Therefore, control-plane overhead and resource occupation to communication channels which the network expends for transmission of various pieces of data are non-negligible.

In current wireless network communication, human-to-human communication is dominating, and data generated in a communication process is highly random. However, when machine type communication (or called as the Internet of things) starts to occupy a larger and larger communication market, pressure of machine type communication data on a network becomes higher and higher. Most of machine type communication adopts such a mode where a sensor reports sensed data to a user or an application server, amount of data is very small and a content thereof is undiversified, but a huge number of machine type terminals bring great pressure on a capacity and channel resources of a wireless communication network after entering the wireless communication network. Since channel resources of a wireless network are limited by spectrum resources, for example, a wireless bandwidth of a Long Term Evolution (LTE) network which is latest at present is maximally 20 MHz, far smaller than a throughput of the wireless network, such pressure becomes particularly prominent in the wireless communication network.

Considering that data of machine type communication is different from that of human-to-human communication, and the data of machine type communication has a relatively high regularity, it is necessary to think out a targeted data transmission optimization method to reduce the pressure of small data on the wireless communication network.

SUMMARY

The disclosure provides a method and device for data transmission in a wireless communication network, which solve the problem of how to reduce pressure of small data on the wireless communication network.

A method for data transmission in a wireless communication network includes: acquiring a data regularity of data in a transmitted data packet; determining a subsequent sending manner and corresponding receiving manner for the data having the data regularity; and sending the data having the data regularity according to the determined sending manner.

In an exemplary embodiment, the data regularity is acquired in the following manner, which includes: detecting and making statistics on a data packet to be transmitted generated in the past to acquire the data regularity; or, receiving a statistical result from a receiving end node, and acquiring the data regularity from the statistical result. The statistical result sent by the receiving end node is acquired by making statistics on a data packet which has been received by the receiving end node; or, receiving parameter information sent by an application layer, and acquiring the data regularity according to the parameter information.

In an exemplary embodiment, the step of receiving the parameter information sent by the application layer includes: receiving parameter information sent by a local application layer; or, receiving parameter information sent by the receiving end node. The parameter information is acquired by the receiving end node from the application layer.

In an exemplary embodiment, the data regularity includes a repetition regularity or a numerical value change regularity.

In an exemplary embodiment, the repetition regularity is acquired in the following manner: if a repetition probability of the data packet reaches a preset threshold value or a repetition probability of a part of data of the data packet reaches a preset threshold value, determining that the data packet or the part of data of the data packet conforms to the repetition regularity, and identifying the data packet or the part of data of the data packet meeting the threshold value as a first type of optimizable data; herein a statistical way for the repetition probability includes: a total number of repetition times in a preset time period, or a total number of continuous repetition times.

In an exemplary embodiment, the numerical value change regularity includes an arithmetic progression regularity, a geometric progression regularity, a periodic sequence regularity and an index series regularity; the numerical value change regularity is preset by a sending end node or a receiving end node in advance; or, the numerical value change regularity is added by the sending end node and the receiving end node as required; herein data meeting the numerical value change regularity is identified as a second type of optimizable data.

In an exemplary embodiment, the subsequent sending manner and corresponding receiving manner for the data having the data regularity include: at least one of a first sending and receiving rule, a second sending and receiving rule and a third sending and receiving rule.

The first sending and receiving rule includes that: the sending end node is not required to request to the receiving end node for an uplink resource for sending the data having the data regularity, and is also not required to send the data having the data regularity on an available uplink resource; and the receiving end node acquires a content corresponding to the data having the data regularity; or, the sending end node is only required to send to the receiving end node a remaining part, except for the data having the data regularity, of data to be transmitted, and the receiving end node acquires the content corresponding to the data having the data regularity and fills the data packet sent by the sending end node with the acquired content.

The second sending and receiving rule includes that: if the data packet to be transmitted is the data having the data regularity or a part of the data packet to be transmitted is the data having the data regularity, the sending end node allocates a unique corresponding temporary replacement code to each kind of data having the data regularity, replaces the data having the data regularity with the corresponding temporary replacement code and sends to the receiving end node; and the receiving end node replaces the temporary replacement code with a content corresponding to the temporary replacement code.

The third sending and receiving rule includes that: the sending end node is not required to request to the receiving end node for the uplink resource for sending the data having the data regularity, and is also not required to send the data having the data regularity on the available uplink resource; and the receiving end node acquires the data regularity to which the data having the data regularity conforms, and calculates to acquire the content of the data packet sent by the sending end node according to the data regularity; or, the sending end node is only required to send to the receiving end node the remaining part, except for the data having the data regularity, of the data to be transmitted; and the receiving end node acquires the data regularity to which the data having the data regularity conforms, calculates to acquire the content in the data packet sent by the sending end node according to the data regularity, and fills the data packet sent by the sending end node with the content acquired by calculating.

In an exemplary embodiment, the first sending and receiving rule and/or the third sending and receiving rule further include/includes: when only the remaining part, except for the data having the data regularity, of the data packet to be transmitted is required to be sent to the receiving end node, notifying the receiving end node of current data including the data having the data regularity and a position of the data having the data regularity in the data packet; and a notification manner includes: notifying through a dedicated signaling or through a Media Access Control (MAC) header, or notifying by appending an indication in the sent data.

In an exemplary embodiment, the temporary replacement code is defined by the receiving end node or the sending end node of the data packet to be transmitted, or is determined by mutual negotiation of the sending end node and the receiving end node.

In an exemplary embodiment, a sending way for the temporary replacement code includes: sending through a control channel; or, sending through a dedicated data channel. The dedicated data channel is a data channel configured for the sending end node by the receiving end node and dedicated to replacement code sending; or, sending through a shared data channel. The shared data channel is a non-dedicated data channel configured to transmit any user-plane data, and a resource in the shared data channel is temporarily configured for the sending end node only when the sending end node has a requirement for transmitting the replacement code.

In an exemplary embodiment, the step of determining the subsequent sending manner and corresponding receiving manner for the data having the data regularity includes: determining a type of optimizable data corresponding to the data having the data regularity; and determining the subsequent sending manner and corresponding receiving manner for the data having the data regularity according to the type of the optimizable data.

In an exemplary embodiment, a sending manner and corresponding receiving manner corresponding to the first type of the optimizable data adopt the first sending and receiving rule and/or the second sending and receiving rule; and a sending manner and corresponding receiving manner corresponding to the second type of the optimizable data adopt the third sending and receiving rule.

In an exemplary embodiment, the step of determining a subsequent sending manner and corresponding receiving manner for the data having the data regularity includes: the sending end node determining the subsequent sending manner and corresponding receiving manner for the data having the data regularity; or, the sending end node receiving from the receiving end node the subsequent sending manner and corresponding receiving manner for the data having the data regularity determined by the receiving end node.

In an exemplary embodiment, after determining the subsequent sending manner and corresponding receiving manner for the data having the data regularity, the method further includes: sending at least one of the following information to the receiving end node, which includes: the subsequent sending manner and corresponding receiving manner for the data having the data regularity; and description information of the data having the data regularity.

In an exemplary embodiment, the method further includes: when the sending end node is a core network node, the core network node sending the subsequent sending manner and corresponding receiving manner for the data having the data regularity and the description information of the data having the data regularity to an access network node which establishes a connection with the receiving end node.

In an exemplary embodiment, the description information of the data having the data regularity includes: a content of the optimizable data, a type of the optimizable data, or a data regularity to which the second type of the optimizable data conforms.

In an exemplary embodiment, the description information of the data having the data regularity further includes at least one of: a position in the current data packet, an offset position of the second type of the optimizable data in a sequence which conforms to the data regularity, a service data source, a data sending period of the service data source, a service type and an equipment type.

A method for data transmission in a wireless communication network includes: acquiring a data regularity of data in a received data packet; determining a subsequent sending manner and corresponding receiving manner for the data having the data regularity; and parsing and restoring the data having the data regularity according to the determined receiving manner.

In an exemplary embodiment, the data regularity is acquired in the following manner, which includes: detecting and making statistics on the received data packet to acquire the data regularity; or, receiving a statistical result from a sending end node, and acquiring the data regularity from the statistical result. The statistical result sent by the sending end node is acquired by making statistics on a transmitted data packet by the sending end node; or, receiving parameter information sent by an application layer, and acquiring the data regularity according to the parameter information.

In an exemplary embodiment, the step of receiving the parameter information sent by the application layer includes: receiving parameter information sent by a local application layer; or, receiving parameter information sent by the sending end node. The parameter information is acquired by the sending end node from the application layer.

In an exemplary embodiment, the data regularity includes a repetition regularity or a numerical value change regularity.

In an exemplary embodiment, the repetition regularity is acquired in the following manner: if a repetition probability of the data packet reaches a preset threshold value or a repetition probability of a part of data of the data packet reaches a preset threshold value, determining that the data packet or the part of data of the data packet conforms to the repetition regularity, and identifying the data packet or the part of data of the data packet meeting the threshold value as a first type of optimizable data; herein a statistical way for the repetition probability includes: a total number of repetition times in a preset time period, or a total number of continuous repetition times.

In an exemplary embodiment, the numerical value change regularity includes an arithmetic progression regularity, a geometric progression regularity, a periodic sequence regularity and an index series regularity; the numerical value change regularity is preset by a sending end node or a receiving end node in advance; or, the numerical value change regularity is added by the sending end node and the receiving end node as required; herein data meeting the numerical value change regularity is identified as a second type of optimizable data.

In an exemplary embodiment, the subsequent sending manner and corresponding receiving manner for the data having the data regularity include: at least one of a first sending and receiving rule, a second sending and receiving rule and a third sending and receiving rule.

The first sending and receiving rule includes that: the sending end node is not required to request to the receiving end node for an uplink resource for sending the data having the data regularity, and is also not required to send the data having the data regularity on an available uplink resource; and the receiving end node acquires a content corresponding to the data having the data regularity; or, the sending end node is only required to send to the receiving end node a remaining part, except for the data having the data regularity, of data to be transmitted, and the receiving end node acquires the content corresponding to the data having the data regularity and fills the data packet sent by the sending end node with the acquired content.

The second sending and receiving rule includes that: if the data packet to be transmitted is the data having the data regularity or a part of the data packet to be transmitted is the data having the data regularity, the sending end node allocates a unique corresponding temporary replacement code to each kind of data having the data regularity, replaces the data having the data regularity with the corresponding temporary replacement code and sends to the receiving end node; and the receiving end node replaces the temporary replacement code in the data packet sent by the sending end node with a content corresponding to the temporary replacement code.

The third sending and receiving rule includes that: the sending end node is not required to request to the receiving end node for the uplink resource for sending the data having the data regularity, and is also not required to send the data having the data regularity on the available uplink resource; and the receiving end node acquires the data regularity to which the data having the data regularity conforms, and calculates to acquire the content of the data packet sent by the sending end node according to the data regularity; or, the sending end node is only required to send to the receiving end node the remaining part, except for the data having the data regularity, of the data to be transmitted; and the receiving end node acquires the data regularity to which the data having the data regularity conforms, calculates to acquire the content in the data packet sent by the sending end node according to the data regularity, and fills the data packet sent by the sending end node with the acquired calculation result.

In an exemplary embodiment, the step of determining a subsequent sending manner and corresponding receiving manner for the data having the data regularity includes: determining a type of optimizable data corresponding to the data having the data regularity; and determining the subsequent sending manner and corresponding receiving manner for the data having the data regularity are determined according to the type of the optimizable data.

In an exemplary embodiment, a sending manner and corresponding receiving manner corresponding to the first type of the optimizable data adopt the first sending and receiving rule and/or the second sending and receiving rule; and a sending manner and corresponding receiving manner corresponding to the second type of the optimizable data adopt the third sending and receiving rule.

In an exemplary embodiment, the step of determining a subsequent sending manner and corresponding receiving manner for the data having the data regularity includes: the receiving end node determining the subsequent sending manner and corresponding receiving manner for the data having the data regularity; or, the receiving end node receiving from the sending end node the subsequent sending manner and corresponding receiving manner for the data having the data regularity determined by the sending end node.

In an exemplary embodiment, after determining the subsequent sending manner and corresponding receiving manner for the data having the data regularity, the method further includes: sending at least one of the following information to the sending end node, which includes: the subsequent sending manner and corresponding receiving manner for the data having the data regularity; and description information of the data having the data regularity.

In an exemplary embodiment, the description information of the data having the data regularity includes: a content of the optimizable data, a type of the optimizable data, or a data regularity to which the second type of the optimizable data conforms.

In an exemplary embodiment, the description information of the data having the data regularity further includes at least one of: a position in the current data packet, an offset position of the second type of the optimizable data in a sequence which conforms to the data regularity, a service data source, a data sending period of the service data source, a service type and an equipment type.

In an exemplary embodiment, the method further includes: when the receiving end node is a core network node, the core network node sending the subsequent sending manner and corresponding receiving manner for the data having the data regularity and the description information of the data having the data regularity to an access network node which establishes a connection with the sending end node.

A device for data transmission in a wireless communication network includes a first acquisition module, a first determination module and a first sending module. The first acquisition module is configured to acquire a data regularity of data in a transmitted data packet. The first determination module is configured to determine a subsequent sending manner and corresponding receiving manner for the data having the data regularity. The first sending module is configured to send the data having the data regularity according to the determined sending manner.

In an exemplary embodiment, the data regularity determined by the first determination module is acquired in the following manner, which includes: detecting and making statistics on a data packet to be transmitted generated in the past to acquire the data regularity; or, receiving a statistical result from a receiving end node, and acquiring the data regularity from the statistical result. The statistical result sent by the receiving end node is acquired by making statistics on a data packet which has been received by the receiving end node; or, receiving parameter information sent by an application layer, and acquiring the data regularity according to the parameter information.

In an exemplary embodiment, the first determination module is configured to receive parameter information sent by a local application layer; or, receive parameter information sent by the receiving end node. The parameter information is acquired by the receiving end node from the application layer.

In an exemplary embodiment, the data regularity includes a repetition regularity or a numerical value change regularity.

In an exemplary embodiment, the repetition regularity is acquired in the following manner: if a repetition probability of the data packet reaches a preset threshold value or a repetition probability of a part of data of the data packet reaches a preset threshold value, determining that the data packet or the part of data of the data packet conforms to the repetition regularity, and identifying the data packet or the part of data of the data packet meeting the threshold value as a first type of optimizable data; herein a statistical way for the repetition probability includes: a total number of repetition times in a preset time period, or a total number of continuous repetition times.

In an exemplary embodiment, the numerical value change regularity includes an arithmetic progression regularity, a geometric progression regularity, a periodic sequence regularity and an index series regularity; the numerical value change regularity is preset by a sending end node or a receiving end node in advance; or, the numerical value change regularity is added by the sending end node and the receiving end node as required; herein data meeting the numerical value change regularity is identified as a second type of optimizable data.

In an exemplary embodiment, the subsequent sending manner and corresponding receiving manner for the data having the data regularity include: at least one of a first sending and receiving rule, a second sending and receiving rule and a third sending and receiving rule.

The first sending and receiving rule includes that: the sending end node is not required to request to the receiving end node for an uplink resource for sending the data having the data regularity, and is also not required to send the data having the data regularity on an available uplink resource; and the receiving end node acquires a content corresponding to the data having the data regularity; or, the sending end node is only required to send to the receiving end node a remaining part, except for the data having the data regularity, of data to be transmitted, and the receiving end node acquires the content corresponding to the data having the data regularity and fills the data packet sent by the sending end node with the acquired content.

The second sending and receiving rule includes that: if the data packet to be transmitted is the data having the data regularity or a part of the data packet to be transmitted is the data having the data regularity, the sending end node allocates a unique corresponding temporary replacement code to each kind of data having the data regularity, replaces the data having the data regularity with the corresponding temporary replacement code and sends to the receiving end node; and the receiving end node replaces the temporary replacement code with a content corresponding to the temporary replacement code.

The third sending and receiving rule includes that: the sending end node is not required to request to the receiving end node for the uplink resource for sending the data having the data regularity, and is also not required to send the data having the data regularity on the available uplink resource; and the receiving end node acquires the data regularity to which the data having the data regularity conforms, and calculates to acquire the content of the data packet sent by the sending end node according to the data regularity; or, the sending end node is only required to send to the receiving end node the remaining part, except for the data having the data regularity, of the data to be transmitted; and the receiving end node acquires the data regularity to which the data having the data regularity conforms, calculates to acquire the content in the data packet sent by the sending end node according to the data regularity, and fills the data packet sent by the sending end node with the content acquired by calculating.

In an exemplary embodiment, the first sending and receiving rule and/or the third sending and receiving rule further include/includes: when only the remaining part, except for the data having the data regularity, of the data packet to be transmitted is required to be sent to the receiving end node, notifying the receiving end node of current data including the data having the data regularity and a position of the data having the data regularity in the data packet; and a notification manner includes: notifying through a dedicated signaling or through a MAC header, or notifying by appending an indication in the sent data.

In an exemplary embodiment, the temporary replacement code is defined by the receiving end node or the sending end node of the data packet to be transmitted, or is determined by mutual negotiation of the sending end node and the receiving end node.

In an exemplary embodiment, a sending way for the temporary replacement code includes: sending through a control channel; or, sending through a dedicated data channel. The dedicated data channel is a data channel configured for the sending end node by the receiving end node and dedicated to replacement code sending; or, sending through a shared data channel. The shared data channel is a non-dedicated data channel configured to transmit any user-plane data, and a resource in the shared data channel is temporarily configured for the sending end node only when the sending end node has a requirement for transmitting the replacement code.

In an exemplary embodiment, the first determination module includes: a first determination unit, configured to determine a type of optimizable data corresponding to the data having the data regularity; and a second determination unit, configured to determine the subsequent sending manner and corresponding receiving manner for the data having the data regularity according to the type of the optimizable data.

In an exemplary embodiment, a sending manner and corresponding receiving manner corresponding to the first type of the optimizable data adopt the first sending and receiving rule and/or the second sending and receiving rule; and a sending manner and corresponding receiving manner corresponding to the second type of the optimizable data adopt the third sending and receiving rule.

In an exemplary embodiment, the subsequent sending manner and corresponding receiving manner for the data having the data regularity are acquired in the following manner, which includes: the sending end node determining the subsequent sending manner and corresponding receiving manner for the data having the data regularity; or, the sending end node receiving from the receiving end node the subsequent sending manner and corresponding receiving manner for the data having the data regularity determined by the receiving end node.

In an exemplary embodiment, the device further includes: a second sending module, configured to send at least one of the following information to the receiving end node, which includes: the subsequent sending manner and corresponding receiving manner for the data having the data regularity; and description information of the data having the data regularity.

In an exemplary embodiment, the device further includes: a third sending module, configured to, when the sending end node is a core network node, send the subsequent sending manner and corresponding receiving manner for the data having the data regularity and the description information of the data having the data regularity to an access network node which establishes a connection with the receiving end node.

In an exemplary embodiment, the description information of the data having the data regularity includes: a content of the optimizable data, a type of the optimizable data, or a data regularity to which the second type of the optimizable data conforms.

In an exemplary embodiment, the description information of the data having the data regularity further includes at least one of: a position in the current data packet, an offset position of the second type of the optimizable data in a sequence which conforms to the data regularity, a service data source, a data sending period of the service data source, a service type and an equipment type.

A device for data transmission in a wireless communication network includes: a second acquisition module, a second determination module and a processing module. The second acquisition module is configured to acquire a data regularity of data in a received data packet. The second determination module is configured to determine a subsequent sending manner and corresponding receiving manner for the data having the data regularity. The processing module is configured to parse and restore the data having the data regularity according to the determined receiving manner.

In an exemplary embodiment, the data regularity is acquired in the following manner, which includes: detecting and making statistics on the received data packet to acquire the data regularity; or, receiving a statistical result from a sending end node, and acquiring the data regularity from the statistical result. The statistical result sent by the sending end node is acquired by making statistics on a transmitted data packet by the sending end node; or, receiving parameter information sent by an application layer, and acquiring the data regularity according to the parameter information.

In an exemplary embodiment, the second determination module is configured to receive parameter information sent by a local application layer; or, receive parameter information sent by the sending end node. The parameter information is acquired by the sending end node from the application layer.

In an exemplary embodiment, the data regularity includes a repetition regularity or a numerical value change regularity.

In an exemplary embodiment, the repetition regularity is acquired in the following manner: if a repetition probability of the data packet reaches a preset threshold value or a repetition probability of a part of data of the data packet reaches a preset threshold value, determining that the data packet or the part of data of the data packet conforms to the repetition regularity, and identifying the data packet or the part of data of the data packet meeting the threshold value as a first type of optimizable data; herein a statistical way for the repetition probability includes: a total number of repetition times in a preset time period, or a total number of continuous repetition times.

In an exemplary embodiment, the numerical value change regularity includes an arithmetic progression regularity, a geometric progression regularity, a periodic sequence regularity and an index series regularity; the numerical value change regularity is preset by a sending end node or a receiving end node in advance; or, the numerical value change regularity is added by the sending end node and the receiving end node as required; herein data meeting the numerical value change regularity is identified as a second type of optimizable data.

In an exemplary embodiment, the subsequent sending manner and corresponding receiving manner for the data having the data regularity include: at least one of a first sending and receiving rule, a second sending and receiving rule and a third sending and receiving rule.

The first sending and receiving rule includes that: the sending end node is not required to request to the receiving end node for an uplink resource for sending the data having the data regularity, and is also not required to send the data having the data regularity on an available uplink resource; and the receiving end node acquires a content corresponding to the data having the data regularity; or, the sending end node is only required to send to the receiving end node a remaining part, except for the data having the data regularity, of data to be transmitted, and the receiving end node acquires the content corresponding to the data having the data regularity and fills the data packet sent by the sending end node with the acquired content.

The second sending and receiving rule includes that: if the data packet to be transmitted is the data having the data regularity or a part of the data packet to be transmitted is the data having the data regularity, the sending end node allocates a unique corresponding temporary replacement code to each kind of data having the data regularity, replaces the data having the data regularity with the corresponding temporary replacement code and sends to the receiving end node; and the receiving end node replaces the temporary replacement code in the data packet sent by the sending end node with a content corresponding to the temporary replacement code.

The third sending and receiving rule includes that: the sending end node is not required to request to the receiving end node for the uplink resource for sending the data having the data regularity, and is also not required to send the data having the data regularity on the available uplink resource; and the receiving end node acquires the data regularity to which the data having the data regularity conforms, and calculates to acquire the content of the data packet sent by the sending end node according to the data regularity; or, the sending end node is only required to send to the receiving end node the remaining part, except for the data having the data regularity, of the data to be transmitted; and the receiving end node acquires the data regularity to which the data having the data regularity conforms, calculates to acquire the content in the data packet sent by the sending end node according to the data regularity, and fills the data packet sent by the sending end node with the acquired calculation result.

In an exemplary embodiment, the second determination module includes: a third determination unit, configured to determine a type of optimizable data corresponding to the data having the data regularity; and a fourth determination unit, configured to determine the subsequent sending manner and corresponding receiving manner for the data having the data regularity according to the type of the optimizable data.

In an exemplary embodiment, a sending manner and corresponding receiving manner corresponding to the first type of the optimizable data adopt the first sending and receiving rule and/or the second sending and receiving rule; and a sending manner and corresponding receiving manner corresponding to the second type of the optimizable data adopt the third sending and receiving rule.

In an exemplary embodiment, the subsequent sending manner and corresponding receiving manner for the data having the data regularity are determined in the following manner, which includes: the receiving end node determining the subsequent sending manner and corresponding receiving manner for the data having the data regularity; or, the receiving end node receiving from the sending end node the subsequent sending manner and corresponding receiving manner for the data having the data regularity determined by the sending end node.

In an exemplary embodiment, the device further includes: a fourth sending module, configured to send at least one of the following information to the sending end node, which includes: the subsequent sending manner and corresponding receiving manner for the data having the data regularity; and description information of the data having the data regularity.

In an exemplary embodiment, the description information of the data having the data regularity includes: a content of the optimizable data, a type of the optimizable data, or a data regularity to which the second type of the optimizable data conforms.

In an exemplary embodiment, the description information of the data having the data regularity further includes at least one of: a position in the current data packet, an offset position of the second type of the optimizable data in a sequence which conforms to the data regularity, a service data source, a data sending period of the service data source, a service type and an equipment type.

In an exemplary embodiment, the device further includes: a fifth sending module, configured to, when the receiving end node is a core network node, send by the core network node the subsequent sending manner and corresponding receiving manner for the data having the data regularity and the description information of the data having the data regularity to an access network node which establishes a connection with the sending end node.

A computer-readable storage medium stores a computer-executable instruction, and the computer-executable instruction is used to execute any abovementioned method.

According to the embodiments provided by the present disclosure, the data regularity is acquired, and the sending and receiving manners for the data having the data regularity are determined, to achieve a purpose of reducing the number of sending times of small data and improve utilization efficiency of wireless resources for small data transmission.

BRIEF DESCRIPTION OF DRAWINGS

FIG. 1 is a schematic diagram of an LTE wireless communication system according to the related technology.

FIG. 2 is a flowchart of a method for data transmission in a wireless communication network according to embodiment one of the present disclosure.

DETAILED DESCRIPTION

Figure 3:
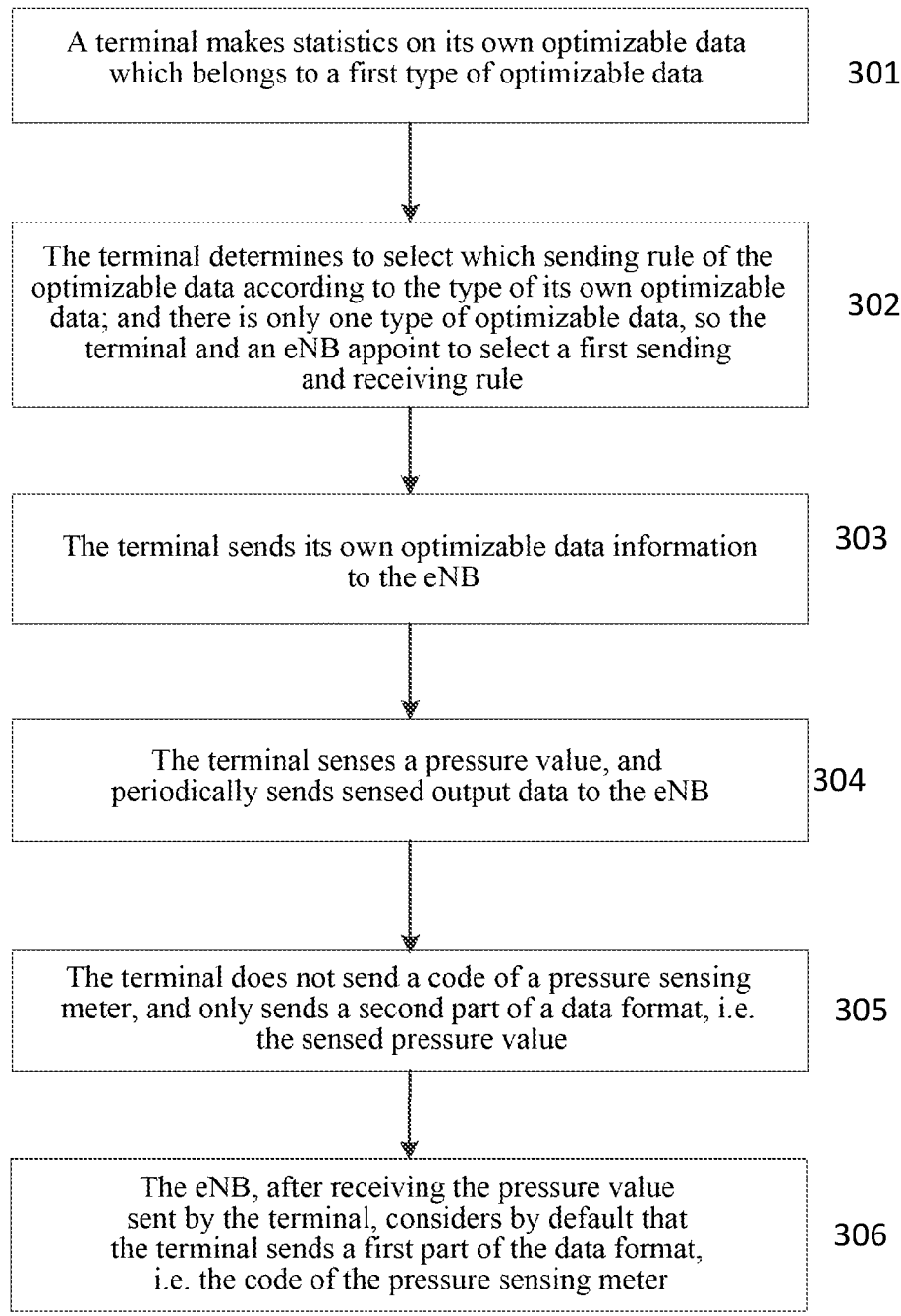
FIG. 3 is a flowchart of a method for data transmission in a wireless communication network according to embodiment two of the present disclosure.

Implementation modes of the present disclosure will be described below in detail with reference to the drawings. It needs to be noted that the embodiments in the present disclosure and characteristics in the embodiments may be freely combined with each other under the condition of no conflicts.

At first, descriptions will be made with optimization for data transmission between a terminal and a base station in an LTE wireless communication system architecture as an example.

FIG. 1 is a schematic diagram of an LTE wireless communication system according to the related technology. As shown in FIG. 1, an access network is constituted by a user terminal and an Evolved NodeB (eNB), and a user-plane data link of the access network is connected to a Serving GateWay (SGW) of a core network.

The user terminal may be of various types, such as a mobile phone which runs an Internet of things application, or a sensor or any terminal with an Internet of things function.

In the following embodiments, four types of terminals are listed as examples.

Terminal 1: an infrared moving object sensor in a smart home, which has a function of sensing whether a moving object appears in a range of the infrared sensor, output data generated is of an enumeration type: 0 and 1. Herein, 0 represents that there is no moving object and 1 represents that there is a moving object, and a generation period for the output data is 1 second.

Terminal 2: a pressure sensing meter in a smart industry, which has a function of sensing a pressure numerical value and reporting the sensed value to a general control background of a factory. A data format of the data is formed by two parts. A first part is a code of the pressure sensing meter, and this part of the data is kept unchanged if they are not modified by a user. A second part is a pressure value sensed by the pressure sensing meter, this part of the data dynamically changes, and a generation period for output data is 2 second. The user, after receiving the data, may monitor a dynamic change of the pressure value of the pressure sensing meter of each code.

Terminal 3: a portable health monitor, which may monitor a heart rhythm of a wearer in real time and send data to a health center background of a hospital, and may also send an alarm indication to the health center background of the hospital under the condition of an abnormal heart rhythm. There are two types of heart rhythm monitoring. One is a real-time monitoring value of which a reporting period is 15 seconds. The other is an hourly average grade of which a reporting period is 1 hour, and a range is divided into 5 grades, that is, [extremely low, low, normal, high, extremely high]. A data format reported for the real-time heart rhythm monitoring value is [a code of the wearer, the real-time heart rhythm monitoring value], and a data format reported for an hourly average heart rhythm monitoring value is [the code of the wearer, the hourly heart rhythm average grade]. The wearer may select to use which monitoring manner independently or by negotiation with the hospital.

Terminal 4: a temperature sensor for a miniature alloy smelting boiler, which is divided into 100 temperature zones. Different curve adjustment is required to be performed on temperatures when different alloy formulae and processes are adopted, and different processes have different temperature control curves. If in a process a temperature at a certain time deviates from a predetermined curve, it is resulted in that the alloy production quality will be not up to standard. In the example, it may be supposed that a smelting period of a certain alloy is 1 hour, and the temperature sensor reports the temperature monitoring value once every 5 minutes, and a required temperature control curve is [50, 50, 60, 70, 80, 80, 80, 80, 80, 50, 25, 5]. Herein, the numerals are temperature zone values.

Optimizable data of each terminal will be described below.

The first terminal (the infrared moving object sensor) has two types of optimizable data, and in different scenarios, 0 and 1 both have relatively high repetition probabilities. For example, when using in a family, a moving frequency of a person in a house is low, so the repetition frequency of 0 is extremely high; and when using in a public place, a large number of persons move, so the repetition frequency of 1 is relatively high.

Optimizable data of the second terminal (the pressure sensing meter) is the first part of the output data, i.e. the code of the pressure sensing meter.

Optimizable data of the third terminal (the portable health monitor) is the code of the wearer and the heart rhythm hourly-average grade.

Optimizable data of the fourth terminal (the temperature sensor for the miniature alloy smelting boiler) is the temperature monitoring values, and when the smelting process is stably controlled, the temperature values are in the representation form of a periodic sequence.

Solutions provided by the embodiments of the present disclosure will be described below.

1: An Acquisition Manner for a Data Regularity (1) The data regularity of a sending end node is acquired in the following manner, and the manner includes the followings.

The data packet to be transmitted generated in the past is detected and made statistics to acquire the data regularity.

Or, a statistical result is received from a receiving end node, and the data regularity is acquired from the statistical result. The statistical result sent by the receiving end node is acquired by making statistics on the data packet which has been received by the receiving end node.

Or, parameter information sent by an application layer is received, and the data regularity is acquired according to the parameter information.

The step of receiving the parameter information sent by the application layer includes: receiving parameter information sent by a local application layer; or, receiving parameter information sent by the receiving end node. The parameter information is acquired by the receiving end node from the application layer.

(2) The data regularity of a receiving end node is acquired in the following manner, and the manner includes the followings.

The received data packet is detected and made statistics to acquire the data regularity.

Or, a statistical result is received from the sending end node, and the data regularity is acquired from the statistical result. The statistical result sent by the sending end node is acquired by making statistics on the transmitted data packet by the sending end node.

Or, parameter information sent by the application layer is received, and the data regularity is acquired according to the parameter information.

The step of receiving the parameter information sent by the application layer includes: receiving parameter information sent by a local application layer; or, receiving parameter information sent by the sending end node. The parameter information is acquired by the sending end node from the application layer.

2: A Determination Manner for the Data Regularity

Implementations of the sending end node and the receiving end node are almost the same in the determination manner for the data regularity.

The data regularity includes a repetition regularity or a numerical value change regularity.

(1) The repetition regularity is acquired in the following manner:

If a repetition probability of the data packet reaches a preset threshold value or a repetition probability of a part of data of the data packet reaches a preset threshold value, it is determined that the data packet or the part of data of the data packet conforms to the repetition regularity, and the data packet or the part of data of the data packet meeting the threshold value is identified as a first type of optimizable data;

Herein a statistical way for the repetition probability includes: a total number of repetition times in a preset time period, or a total number of continuous repetition times.

(2) The numerical value change regularity includes an arithmetic progression regularity, a geometric progression regularity, a periodic sequence regularity and an index series regularity.

The numerical value change regularity is preset by a sending end node or the receiving end node in advance; or, the numerical value change regularity is added by the sending end node and the receiving end node as required.

Herein data meeting the numerical value change regularity is identified as a second type of optimizable data.

3: Sending and Receiving Rules

It needs to be noted that the following sending and receiving rules may be determined by the sending end node and may also be determined by the receiving end node.

Contents of the sending and receiving rules will be described below.

The subsequent sending manner and corresponding receiving manner for data having the data regularity include: at least one of a first sending and receiving rule, a second sending and receiving rule and a third sending and receiving rule.

The first sending and receiving rule includes that:

the sending end node is not required to request to the receiving end node for an uplink resource for sending the data having the data regularity, and is also not required to send the data having the data regularity on an available uplink resource, and the receiving end node acquires a content corresponding to the data having the data regularity; or, the sending end node is only required to send to the receiving end node a remaining part, except for the data having the data regularity, of data to be transmitted, and the receiving end node acquires the content corresponding to the data having the data regularity and fills the data packet sent by the sending end node with the acquired content.

The second sending and receiving rule includes that:

if the data packet to be transmitted is the data having the data regularity or a part of the data packet to be transmitted is the data having the data regularity, the sending end node allocates a unique corresponding temporary replacement code to each kind of data having the data regularity, replaces the data having the data regularity with the corresponding temporary replacement code and sends to the receiving end node, and the receiving end node replaces the temporary replacement code in the data packet sent by the sending end node with a content corresponding to the temporary replacement code.

The third sending and receiving rule includes that:

the sending end node is not required to request to the receiving end node for the uplink resource for sending the data having the data regularity, and is also not required to send the data having the data regularity on the available uplink resource, and the receiving end node acquires the data regularity to which the data having the data regularity conforms, and calculates to acquire the content of the data packet sent by the sending end node according to the data regularity; or, the sending end node is only required to send to the receiving end node the remaining part, except for the data having the data regularity, of the data to be transmitted; and the receiving end node acquires the data regularity to which the data having the data regularity conforms, calculates to acquire the content in the data packet sent by the sending end node according to the data regularity and fills the data packet sent by the sending end node with the content acquired by calculating.

For the sending end node, the first sending and receiving rule and/or the third sending and receiving rule further include/includes: when only the remaining part, except for the data having the data regularity, of the data packet to be transmitted is required to be sent to the receiving end node, the receiving end node is notified of current data including the data having the data regularity and a position of the data having the data regularity in the data packet. The notification manner includes: notifying through a dedicated signaling or through a MAC header, or notifying by appending an indication in the sent data.

The step of determining the subsequent sending manner and corresponding receiving manner for the data having the data regularity includes: determining a type of optimizable data corresponding to the data having the data regularity; and determining the subsequent sending manner and corresponding receiving manner for the data having the data regularity according to the type of the optimizable data.

Herein, a sending manner and corresponding receiving manner corresponding to the first type of the optimizable data adopt the first sending and receiving rule and/or the second sending and receiving rule; and a sending manner and corresponding receiving manner corresponding to the second type of the optimizable data adopt the third sending and receiving rule.

4: Information Communication (1) For the sending end node, the step of determining the subsequent sending manner and corresponding receiving manner for the data having the data regularity includes the followings: the sending end node determines the subsequent sending manner and corresponding receiving manner for the data having the data regularity; or, the sending end node receives from the receiving end node the subsequent sending manner and corresponding receiving manner for the data having the data regularity determined by the receiving end node.

After determining the subsequent sending manner and corresponding receiving manner for the data having the data regularity, the following operation is further included.

At least one of the following information is sent to the receiving end node, and the information includes: the subsequent sending manner and corresponding receiving manner for the data having the data regularity, and description information of the data having the data regularity.

When the sending end node is a core network node, the core network node sends the subsequent sending manner and corresponding receiving manner for the data having the data regularity and the description information of the data having the data regularity to an access network node which establishes a connection with the receiving end node.

(2) For the receiving end node, the step of determining the subsequent sending manner and corresponding receiving manner for the data having the data regularity includes the followings: the receiving end node determines the subsequent sending manner and corresponding receiving manner for the data having the data regularity; or, the receiving end node receives from the sending end node the subsequent sending manner and corresponding receiving manner for the data having the data regularity determined by the sending end node.

After the subsequent sending manner and corresponding receiving manner for the data having the data regularity are determined, the following operation is further included.

At least one of the following information is sent to the sending end node, the information includes: the subsequent sending manner and corresponding receiving manner for the data having the data regularity; and description information of the data having the data regularity.

When the receiving end node is a core network node, the core network node sends the subsequent sending manner and corresponding receiving manner for the data having the data regularity and the description information of the data having the data regularity to an access network node which establishes a connection with the sending end node.

It needs to be noted that: no matter for the sending end node or the receiving end node, the description information of the data having the data regularity includes: a content of the optimizable data, a type of the optimizable data or a data regularity to which the second type of the optimizable data conforms.

In an exemplary embodiment, the description information of the data having the data regularity further includes at least one of: a position in the current data packet, an offset position of the second type of the optimizable data in a sequence which conforms to the data regularity, a service data source, a data sending period of the service data source, a service type and an equipment type.

An optimization mechanism for data transmission is as follows.

An application layer of a terminal makes statistics on data generated.

A statistical result of the first terminal (the infrared moving object sensor) is shown in the following table:

| Sequence number of optimizable data | Content of optimizable data | Data sending period of service data source | Service data source |
|---|---|---|---|
| 0 | N | 1 second | Infrared moving object sensor |
| 1 | Second type | 1 second | Infrared moving object sensor |

The optimizable data belong to data repeated for many times, and is the first type of optimizable data. There are totally two kinds, and the second sending and receiving rule may be adopted.

A statistical result of the second terminal (the pressure sensing meter) is shown in the following table:

| Content of optimizable data | Data sending period of service data source |
|---|---|
| Code of the pressure sensing meter | 2 seconds |

The optimizable data is repeated for many times, and is the first type of optimizable data. There is totally one kind, and the first sending and receiving rule may be adopted.

A statistical result of the third terminal (the portable health monitor) is shown in the following table:

| Sequence number of optimizable data | Content of optimizable data | Data sending period of service data source | Service data source |
|---|---|---|---|
| 1 | Wearer code | 15 seconds | Real-time heart rhythm monitoring |
| 2 | Wearer code, extremely low | 3,600 seconds | Hourly average heart rhythm monitoring |
| 3 | Wearer code, low | 3,600 seconds | Hourly average heart rhythm monitoring |
| 4 | Wearer code, normal | 3,600 seconds | Hourly average heart rhythm monitoring |
| 5 | Wearer code, high | 3,600 seconds | Hourly average heart rhythm monitoring |
| 6 | Wearer code, extremely high | 3,600 seconds | Hourly average heart rhythm monitoring |

The optimizable data is repeated for many times, and is the first type of optimizable data. There is totally one kind (wearer code), and the first sending and receiving rule may be adopted.

A statistical result of the fourth terminal is shown in the following table:

| Content of optimizable data | 50,50,60,70,80,80,80,80,80,50,25,5 |
|---|---|
| Data sending period of service data source | 5 minutes |

The optimizable data conforms to a data regularity of a periodic sequence, and is the second type of optimizable data, and the third sending and receiving rule may be adopted.

When the statistical result includes multiple pieces of optimizable data, a node 1 may allocate a temperature replacement code to each piece of optimizable data.

Some feasible embodiments will be described below with the above-mentioned several terminals as examples.

Embodiment One

FIG. 2 is a flowchart of a method for data transmission in a wireless communication network according to embodiment one of the present disclosure. The method is shown in FIG. 2.

An infrared moving object sensor in the smart home has a function of sensing whether a moving object appears in the range of the infrared sensor, and the generated output data is of an enumeration type: N and Y. Herein N represents that there is no moving object, and Y represents that there is a moving object, and the generation period for the output data is 1 second.

In step 201, the terminal makes statistics on the data sent by the terminal itself. Since the output of the infrared moving object sensor has an undiversified and relatively high repetition probability, both two output values of the infrared moving object sensor may be included in the optimizable data and belong to a first type of optimizable data. A result is as follows:

| Content of optimizable data | Data sending period of service data source | Service data source |
|---|---|---|
| N | 1 second | Infrared moving object sensor |
| Y | 1 second | Infrared moving object sensor |

In step 202, the terminal sends its own optimizable data information to the eNB. The optimizable data information includes: a content of the optimizable data, a type, i.e. the first type, of the optimizable data, and a data sending period, i.e. 1 second, of a service data source corresponding to the optimizable data.

In step 203, the terminal determines to select which sending rule of the optimizable data according to the type of its own optimizable data. There are few kinds of optimizable data, data Y is almost generated in the daytime and data N is almost generated at night, and an overlapping probability of the two kinds of data is not large, so either the first sending and receiving rule or the second sending and receiving rule may be adopted. In the example, the terminal and the eNB appoint to select the second sending rule for the optimizable data, and the terminal notifies the eNB of the allocated temporary replacement code.

| Temporary replacement code | Content of optimizable data |
|---|---|
| 0 | N |
| 1 | Y |

In step 204, the eNB configures a dedicated data channel for sending the temporary replacement code for the terminal.

In step 205, the terminal senses, and periodically sends sensed output data to the eNB. The output data is replaced with the temporary replacement code, that is, the data N is replaced with 0, and the data Y is replaced with 1.

In step 206, the eNB, after receiving the replacement code, replaces the temporary replacement code with the optimizable data corresponding to the temporary replacement code, that is, 0 is replaced with N and 1 is replaced with Y, so that the eNB successfully receives the real sensed data sent by the terminal with a minimum occupancy rate for air interface resource.

Embodiment Two

A pressure sensing meter in the smart industry has a function of sensing a pressure numerical value and reporting the sensed value to a general control background of a factory. A format of the reported data is formed by two parts. The first part is a code of the pressure sensing meter, and data of this part is kept unchanged if the data is not modified by a user. The second part is a pressure value sensed by the pressure sensing meter, and this part of data dynamically changes, and a generation period for output data is 2 seconds. The user may monitor a dynamic change of the pressure values on the pressure sensing meter of each code after receiving the data. The optimizable data of the pressure sensing meter is the first part in the output data, i.e. the code of the pressure sensing meter.

FIG. 3 is a flowchart of a method for data transmission in a wireless communication network according to embodiment two of the present disclosure. As shown in FIG. 3, the method includes the following steps 301-306.

In step 301, a terminal makes statistics on data sent by the terminal itself. Herein the optimizable data found by making statistics is as follows and belongs to a first type of optimizable data.

| Content of optimizable data | Data sending period of service data source |
| --- | --- |
| Code of pressure sensing meter | 2 seconds |

In step 302, the terminal determines to select which optimizable data sending rule according to a type of its own optimizable data. There is only one kind of optimizable data, so the terminal and the eNB appoint to select the first sending and receiving rule.

In step 303, the terminal sends its own optimizable data information to the eNB. The optimizable data information includes: a content of the optimizable data, the type of the optimizable data is the first type, a sending period of data of a service data source corresponding to the optimizable data is 2 seconds, and a position of the optimizable data in a current data packet is a start position of the data.

In step 304, the terminal senses a pressure value, and periodically sends the sensed output data to the eNB.

In step 305, the terminal does not send the code of the pressure sensing meter, and only sends the second part of the data format, i.e. the sensed pressure value.

In step 306, the eNB, after receiving the pressure value sent by the terminal, considers by default that the terminal sends the first part of the data format, i.e. the code of the pressure sensing meter.

Embodiment Three

A portable health monitor may monitor a heart rhythm of a wearer in real time and send data to a health center background of a hospital, and may also send an alarm indication to the health center background of the hospital under the condition of an abnormal heart rhythm. There are two types of heart rhythm monitoring. One is a real-time monitoring value of which a reporting period is 15 seconds, and the other is an hourly average grade of which a reporting period is 1 hour and a value range includes 5 grades, i.e., [extremely low, low, normal, high, extremely high]. A data format of the reported real-time heart rhythm monitoring value is [wearer code, real-time heart rhythm monitoring value], and a data format of the reported hourly-average heart rhythm monitoring value is [wearer code, heart rhythm hourly-average grade]. The wearer may select to use which monitoring manner independently or by negotiation with the hospital.

Figure 4:
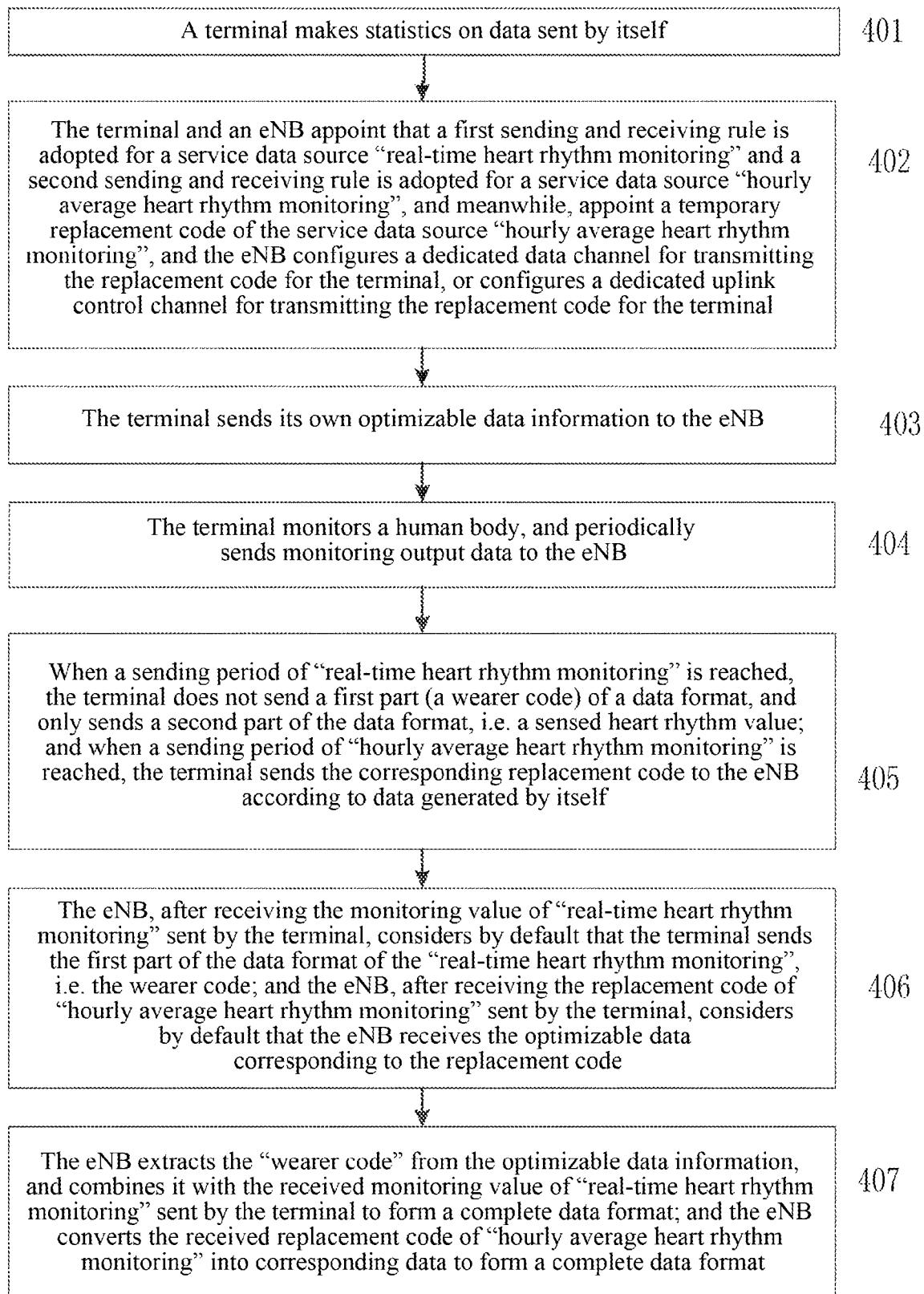
FIG. 4 is a flowchart of a method for data transmission in a wireless communication network according to embodiment three of the present disclosure.

FIG. 4 is a flowchart of a method for data transmission in a wireless communication network according to embodiment three of the present disclosure. As shown in FIG. 4, the method includes the following steps 401-407.

In step 401, a terminal makes statistics on data sent by the terminal itself. The optimizable data found by making the statistics is from two data sources, and as shown below the data belong to the first type of optimizable data.

| Sequence number of optimizable data | Content of optimizable data | Data sending period of service data source | Service data source |
| --- | --- | --- | --- |
| 1 | Wearer code | 15 seconds | Real-time heart rhythm monitoring |
| 2 | Wearer code, extremely low | 3,600 seconds | Hourly average heart rhythm monitoring |
| 3 | Wearer code, low | 3,600 seconds | Hourly average heart rhythm monitoring |
| 4 | Wearer code, normal | 3,600 seconds | Hourly average heart rhythm monitoring |
| 5 | Wearer code, high | 3,600 seconds | Hourly average heart rhythm monitoring |
| 6 | Wearer code, extremely high | 3,600 seconds | Hourly average heart rhythm monitoring |

In step 402, the terminal and the eNB appoint to adopt which optimizable data sending rule. Since there is only one kind of optimizable data for "real-time heart rhythm monitoring", and a sending rule 1 of the optimizable data is suitable to be selected; while the optimizable data for "hourly-average heart rhythm monitoring" conforms to an enumeration type, and there are 5 kinds of data which are relatively more, and then a second sending and receiving rule is suitable to be selected. Therefore, through a dedicated signaling the terminal and the eNB appoint that: a first sending and receiving rule is adopted for the service data source "real-time heart rhythm monitoring", and a sending rule 2 of the optimizable data is adopted for the service data source "hourly-average heart rhythm monitoring", and meanwhile, appoint a temporary replacement code of the service data source "hourly-average heart rhythm monitoring". For example, the sequence number of the optimizable data is adopted as the replacement code (a replacement code of [wearer code, extremely low] is 2, a replacement code of [wearer code, low] is 3, and so on). The eNB configures a dedicated data channel for transmitting the replacement code for the terminal, or configures a dedicated uplink control channel for transmitting the replacement code for the terminal.

In step 403, the terminal sends its own optimizable data information to the eNB. The optimizable data information includes: a content of the optimizable data (the wearer code, and the 5 enumerated values of hourly-average heart rhythm monitoring), a type of the optimizable data is the first type, a sending period of data of a service data source corresponding to the optimizable data (15 seconds for real-time heart rhythm monitoring and 3,600 seconds for hourly-average heart rhythm monitoring), and a position of the optimizable data in the current data packet is a start position of the data (the wearer code is located at the start position of the real-time heart rhythm monitoring data).

In step 404, the terminal monitors a human body, and periodically sends the monitoring output data to the eNB.

In step 405, when the sending period of "real-time heart rhythm monitoring" is reached, the terminal does not send the first part (the wearer code) of the data format, and only sends the second part of the data format, i.e., the sensed heart rhythm value. When the sending period of "hourly-average heart rhythm monitoring" is reached, the terminal sends the corresponding replacement code to the eNB according to the data generated by itself.

In step 406, the eNB, after receiving the monitoring value of "real-time heart rhythm monitoring" sent by the terminal, considers by default that the terminal sends the first part of the data format for "real-time heart rhythm monitoring", i.e., the wearer code. The eNB, after receiving the replacement code of "hourly-average heart rhythm monitoring" sent by the terminal, considers by default that the optimizable data corresponding to the replacement code is received.

In step 407, the eNB extracts the "wearer code" from the optimizable data information, and combines it with the received monitoring value of "real-time heart rhythm monitoring" sent by the terminal to form a complete data format. The eNB converts the received replacement code of "hourly-average heart rhythm monitoring" into the corresponding data to form a complete data format.

Embodiment Four

A temperature sensor for a miniature alloy smelting boiler includes 100 temperature zones. When different alloy formulae and processes are adopted, different curve adjustments are required to be performed on temperatures and different processes have different temperature control curves. If a temperature at a certain time in the process deviates from a preset curve, then it is caused that the alloy production quality will be not up to standard. In the example, it may be supposed that a smelting period of a certain alloy is 1 hour, and the temperature sensor reports a temperature monitoring value once every 5 minutes, and a required temperature control curve is [50, 50, 60, 70, 80, 80, 80, 80, 80, 50, 25, 5], in which, the numerals are temperature zone values. The optimizable data is the temperature monitoring value. When a smelting process is stably controlled, the temperature values are in a representation form of a periodic sequence.

Figure 5:
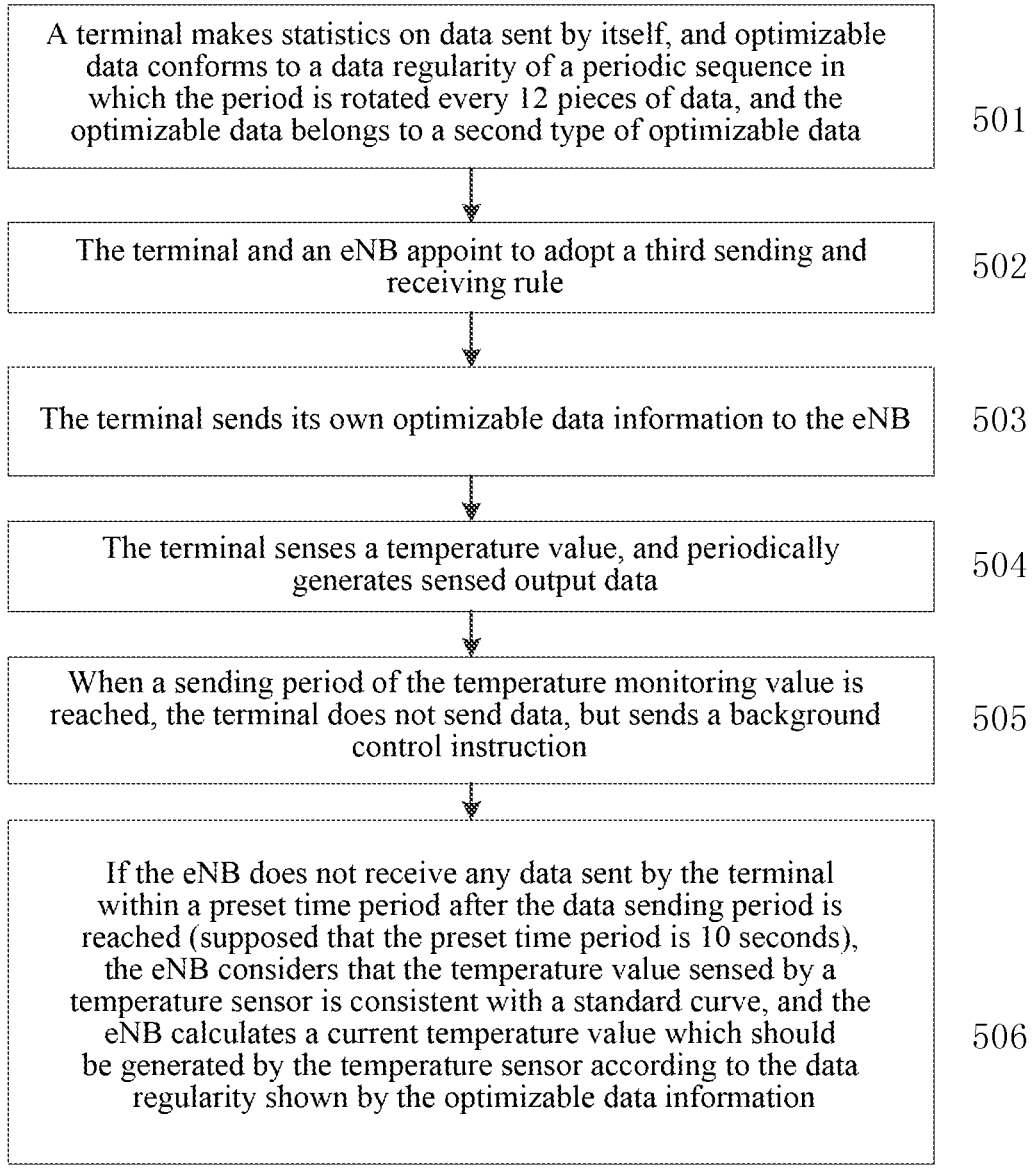
FIG. 5 is a flowchart of a method for data transmission in a wireless communication network according to embodiment four of the present disclosure.

FIG. 5 is a flowchart of a method for data transmission in a wireless communication network according to embodiment four of the present disclosure. As shown in FIG. 5, the method includes steps 501-506.

In step 501, a terminal makes statistics on data sent by the terminal itself. A table is shown as follows.

| Content of optimizable data | 50,50,60,70,80,80,80,80,80,50,25,5 |
|---|---|
| Data sending period of service data source | 5 minutes |

The optimizable data conforms to a data regularity of a periodic sequence, and the period is rotated once every 12 data, and the optimizable data belongs to the second type of optimizable data.

In step 502, the terminal determines to select which sending rule of the optimizable data according to the type of its own optimizable data. Since the optimizable data belongs to the second type of the optimizable data, the terminal and the eNB appoint to adopt a third sending and receiving rule.

In step 503, the terminal sends its own optimizable data information to the eNB. The optimizable data information includes: a content of the optimizable data, a type of the optimizable data is the second type, a sending period of data of a service data source corresponding to the optimizable data is 5 minutes, and a data regularity corresponding to the optimizable data (which conforms to the "periodic sequence", and the next data packet is the $K^{th}$ one in the periodic sequence).

In step 504, the terminal senses a temperature value, and periodically generates the sensed output data.

In step 505, when a sending period of the temperature monitoring value is reached, the terminal does not send data.

In step 506, if the eNB does not receive any data sent by the terminal within a preset time period after the sending period of the data is reached (supposed that the preset time period is 10 seconds), the eNB considers that the temperature value sensed by the temperature sensor conforms to a standard curve, and the eNB calculates the current temperature value which should be generated by the temperature sensor according to the data regularity shown in the optimizable data information.

Embodiment Five: Data Transmission Optimization of a Downlink Between an eNB and a Terminal in an LTE Wireless Communication System Architecture Supposed that the embodiment has the same scenario and network architecture (shown in FIG. 1) with embodiment one, then similar to embodiment one, when the eNB has an optimizable data service to be sent to the terminal, the eNB may be used as a sending end node, and the terminal may be used as a receiving end node.

A solution concept is the same as that of the embodiment one.

A pressure controller in a smart industry receives a control command from a background, and a data format of the control command is [pressure controller code, pressure target value] and a sending period thereof is 2 seconds.

Figure 6:
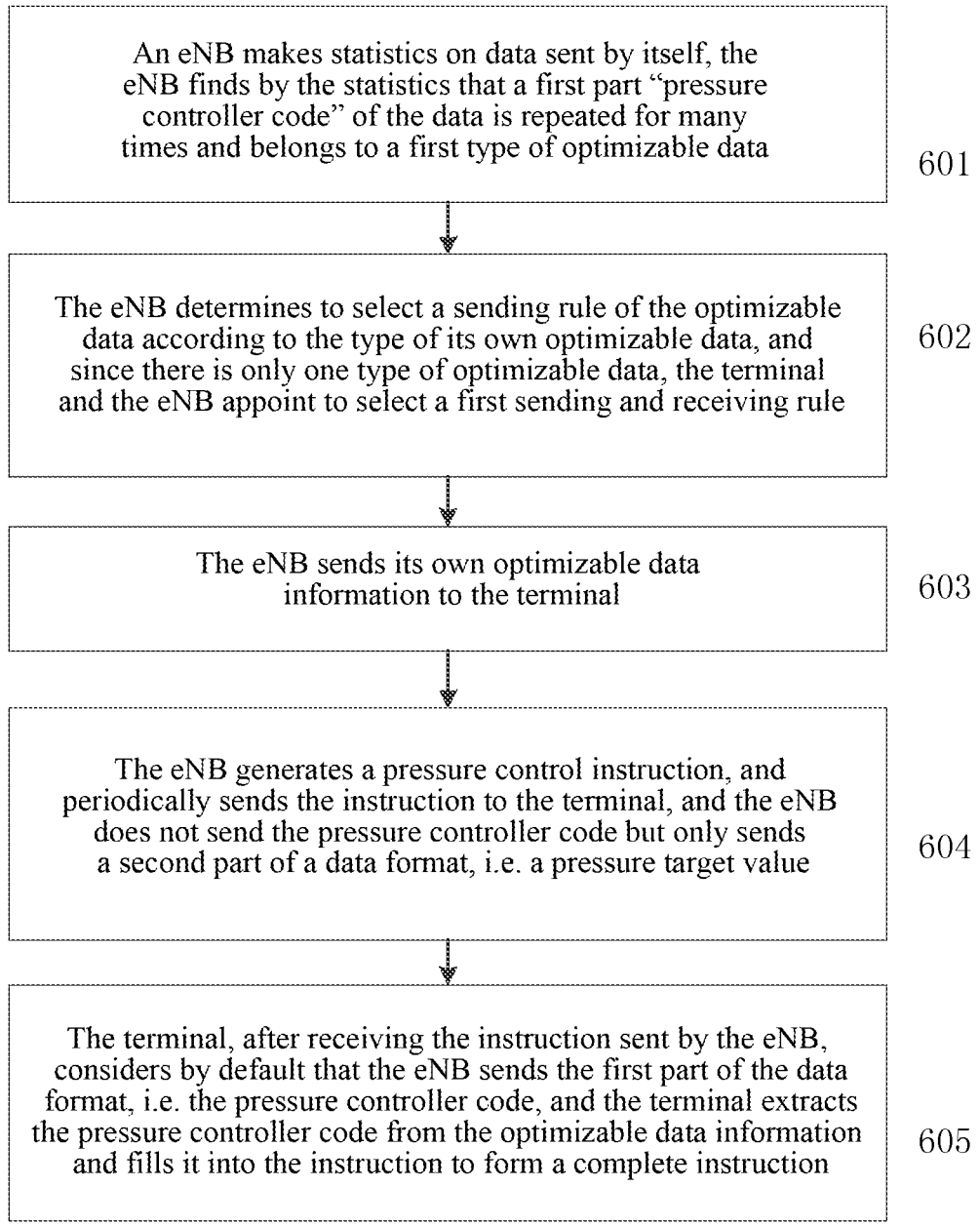
FIG. 6 is a flowchart of a method for data transmission in a wireless communication network according to embodiment five of the present disclosure.

FIG. 6 is a flowchart of a method for data transmission in a wireless communication network according to embodiment five of the present disclosure. As shown in FIG. 6, the method includes the following steps 601-605.

In step 601, the eNB makes statistics on data sent by the eNB itself, and it is found by the statistics that a first part "pressure controller code" of the data is repeated for many times and belongs to the first type of optimizable data.

In step 602, the eNB determines to select which optimizable data sending rule according to the type of its own optimizable data. There is only one kind of optimizable data, so the terminal and the eNB appoint to select a first sending and receiving rule.

In step 603, the eNB sends its own optimizable data information to the terminal. The optimizable data information includes: a content of the optimizable data, a type, i.e. the first type, of the optimizable data, a data sending period, i.e. 2 seconds, of a service data source corresponding to the optimizable data, and a position, i.e. a start position of data, of the optimizable data in a current data packet.

In step 604, the eNB generates a pressure control instruction, and periodically sends the instruction to the terminal. The eNB does not send the pressure controller code, but only sends the second part of the data format, i.e. a pressure target value.

In step 605, the terminal considers by default that the eNB sends the first part of the data format, i.e. the pressure controller code, after receiving the instruction sent by the eNB, and the terminal extracts the pressure controller code from the optimizable data information, and supplements it into the instruction to form a complete instruction.

Figure 7:
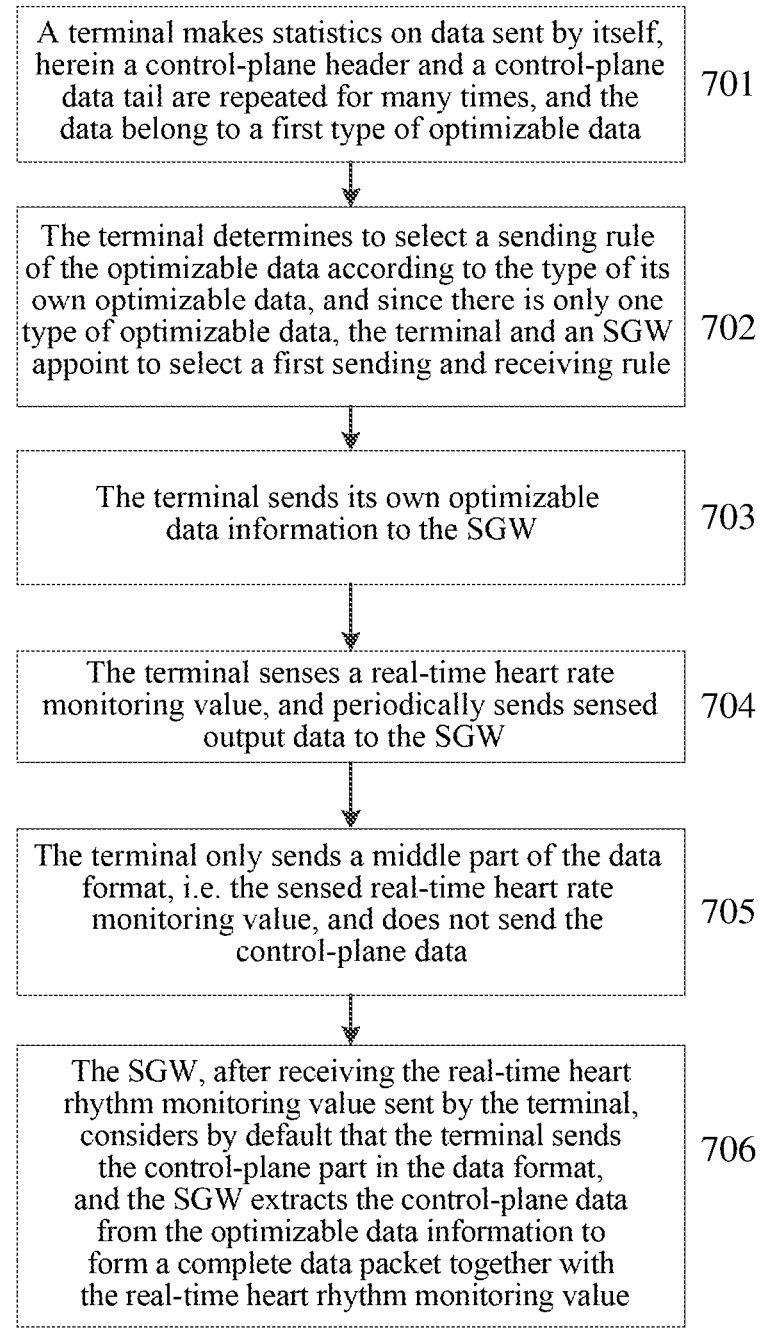
FIG. 7 is a flowchart of a method for data transmission in a wireless communication network according to embodiment six of the present disclosure.

Embodiment Six: Data Transmission Optimization Between a Terminal and an SGW in an LTE Wireless Communication System Architecture FIG. 7 is a flowchart of a method for data transmission in a wireless communication network according to embodiment six of the present disclosure. The method is shown in FIG. 7.

In an LTE system network architecture, user-plane data and control-plane data of the terminal are required to pass through the SGW, so the terminal and the SGW may form a sending end node and a receiving end node in a data compression scenario together.

Figure 8:
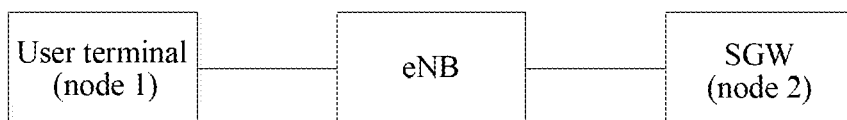
FIG. 8 is a schematic diagram of a network according to embodiment six of the present disclosure.

FIG. 8 is a schematic diagram of a network according to embodiment six of the present disclosure. As shown in FIG. 8, a link from the terminal to the SGW is formed by connecting two links in series (a link from the terminal to an eNB and a link from the eNB to the SGW). Herein, the link from the terminal to the eNB is a wireless link, and the link from the eNB to the SGW is a wired link.

The terminal is a portable health monitor, and only a "real-time heart rhythm monitoring" function is enabled, and data is generated once every 15 seconds. A patient is in a sickroom of a hospital, and the data is fixedly reported to a health monitoring background of the hospital. Due to fixation of end-to-end of a communication link, in a communication process, transmission protocol interfaces of two parties are fixed, and Internet Protocol (IP) addresses of the two parties may not change. The whole data is small data and may be sent by single sending, so data packet re-segmentation on a link layer is not required, and in a data packet sent by the terminal, control-plane data is fixed, and user-plane data changes in real time.

As shown in FIG. 7, a flow is as follows.

In step 701, the terminal makes statistics on data sent by the terminal itself. A data packet format found by making the statistics is as follows. A control-plane header and a control-plane data tail are repeated for many times, and the data therein belong to the first type of optimizable data.

| Control-plane data header | Real-time heart rhythm monitoring value | Control-plane data tail |
|---|---|---|

In step 702, the terminal determines to select which optimizable data sending rule according to the type of its own optimizable data. Since there is only one kind of optimizable data, the terminal and the SGW appoint to select a first sending and receiving rule.

In step 703, the terminal sends its own optimizable data information to the SGW. The optimizable data information includes: a content of the optimizable data (the control-plane header and the control-plane data tail), a type, i.e. the first type, of the optimizable data, a data sending period, i.e. 15 seconds, of a service data source corresponding to the optimizable data, and positions, i.e. a start position and ending position of the data, of the optimizable data in a current data packet.

In step 704, the terminal senses a real-time heart rhythm monitoring value, and periodically sends sensed output data to the SGW.

In step 705, the terminal only sends a middle part of the data format, i.e., the sensed real-time heart rhythm monitoring value, and does not send the control-plane data.

In step 706, the SGW considers by default that the terminal sends a control-plane part in the data format after receiving the real-time heart rhythm monitoring value sent by the terminal, and the SGW extracts the control-plane data from the optimizable data information to form a complete data packet together with the real-time heart rhythm monitoring value.

Embodiment Seven

Difference from the abovementioned embodiments, a rule of data in a data packet may be acquired by a sending end node and may also be acquired by a receiving end node. Descriptions will be made below.

A received data packet is detected and made statistics to acquire the rule of data in the received data packet; or, a statistical result is received from the sending end node, and the rule of the data in the received data packet is acquired from the statistical result; or, parameter information sent by an application layer is received, and the rule of the data in the received data packet is acquired from the parameter information.

In the abovementioned manner, that the parameter information sent by the application layer is received includes that:

parameter information sent by a local application layer is received, for example, if the receiving end node is a sensor or a terminal of another machine type, a manufacturer of the terminal may preset a data regularity to which data generated by the terminal may conform in the application layer, or set a function module for statistics on the data to make the statistics on the data regularity to which the data generated by the terminal conforms in the application layer, and the application layer sends the data regularity to a bottom layer of the terminal (for example, a Non Access Stratum (NAS) or an Access Stratum (AS)); if the receiving end node is an access network node or a core network node, an application provider may preset the data regularity to which the data generated by the terminal may conform in a machine type server corresponding to the machine type terminal, and the access network node or the core network node acquires the data regularity from the machine type server.

Or, parameter information sent by the receiving end node is received. The parameter information is acquired by the receiving end node from the application layer.

After acquiring the rule of the data in the data packet, the receiving end node may notify the sending end node of the rule to determine a subsequent sending manner for data with the rule.

Embodiment Eight

Difference from the abovementioned embodiments, a subsequent sending manner for data with a rule in the embodiment is determined by a receiving end node. Descriptions will be made below.

The subsequent sending manner for the data having the data regularity is determined; and the subsequent sending manner for the data having the data regularity is sent to a sending end node.

Herein, that the subsequent sending manner for the data having the data regularity is determined includes that: a subsequent sending manner for a first type of optimizable data and a second type of optimizable data includes: a first sending rule.

The first sending rule includes that: it is not required to request to a receiving end for an uplink resource for sending the first type of the optimizable data and/or the second type of the optimizable data, and it is also not required to send the first type of the optimizable data and/or the second type of the optimizable data on an available uplink resource; or, it is only required to send to the receiving end a remaining part, except for the first type of the optimizable data and/or the second type of the optimizable data, of data to be transmitted.

The subsequent sending manner for the first type of the optimizable data further includes: a second sending rule.

The second sending rule includes that: a unique corresponding temporary replacement code is allocated to each of the first type of optimizable data, and the first type of the optimizable data is transmitted by virtue of the temporary replacement code; or, if a part of data in a data packet to be transmitted is the first type of the optimizable data, the part of data in the data packet of the data to be transmitted is replaced with the temporary replacement code, and the data packet on which a replacement operation has been completed is sent out.

Herein, the first sending rule further includes that: when only the remaining part, except for the first type of the optimizable data, of the data to be transmitted is required to be sent to the receiving end, the sending end node notifies the receiving end node of current data including the first type of the optimizable data and a position of the first type of the optimizable data in the data packet.

A notification manner includes that: the sending end performs the notification through a dedicated signaling or through a MAC control header, or performs the notification by appending an indication in the sent data.

The receiving end node also sends description information of the data having the data regularity to the sending end node.

Herein, the description information of the data having the data regularity includes: a content of optimizable data, a type of the optimizable data or a data regularity to which the second type of the optimizable data conforms.

In an exemplary embodiment, the description information of the data having the data regularity further includes at least one of: a position in the current data packet, a service data source, a data sending period of the service data source, a service type and an equipment type.

Embodiment Nine

From the abovementioned embodiments, it can be seen that the types of a sending end node and a receiving end node are not limited, and a type of a link between the nodes is also not limited and both a wireless link and a wired link may be adopted in the method of the embodiments of the present disclosure.

Besides an LTE system listed in the abovementioned embodiments, a wireless communication system in the related technology, such as a Universal Mobile Telecommunications System (UMTS), Time Division-Synchronization Code Division Multiple Access (TD-SCDMA) and Code Division Multiple Access 2000 (CDMA2000), may adopt flows of the abovementioned embodiments, and the difference is just names and types of the nodes.

Based on the abovementioned embodiments, the following method flows may be acquired.

Figure 9:
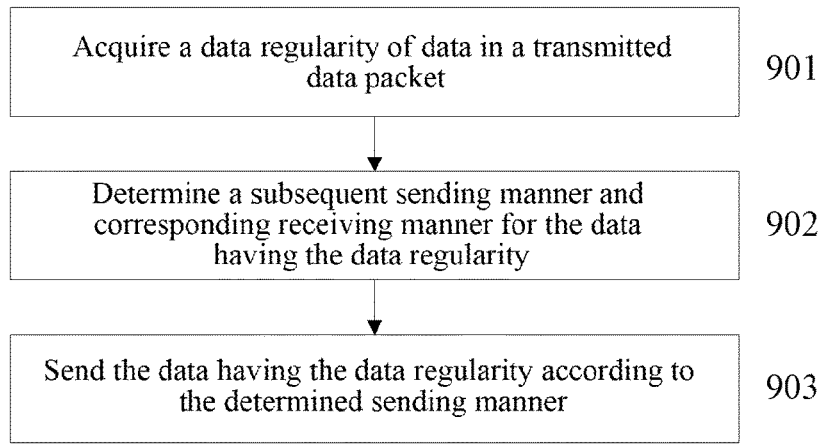
FIG. 9 is a flowchart of a method for data transmission in a wireless communication network according to an embodiment of the present disclosure.

FIG. 9 is a flowchart of a method for data transmission in a wireless communication network according to an embodiment of the present disclosure. As shown in FIG. 9, the method embodiment includes the following steps 901-903.

In step 901, a data regularity of data in a transmitted data packet is acquired.

In step 902, a subsequent sending manner and corresponding receiving manner for the data having the data regularity are determined.

In step 903, the data having the data regularity is sent according to the determined sending manner.

In step 903, the data having the data regularity is sent according to the determined sending manner.

According to the method provided by the embodiment of the present disclosure, the data regularity is acquired, and the sending and receiving manners for the data having the data regularity are determined to achieve a purpose of reducing the number of sending times of small data and improve utilization efficiency of wireless resources for small data transmission.

Figure 10:
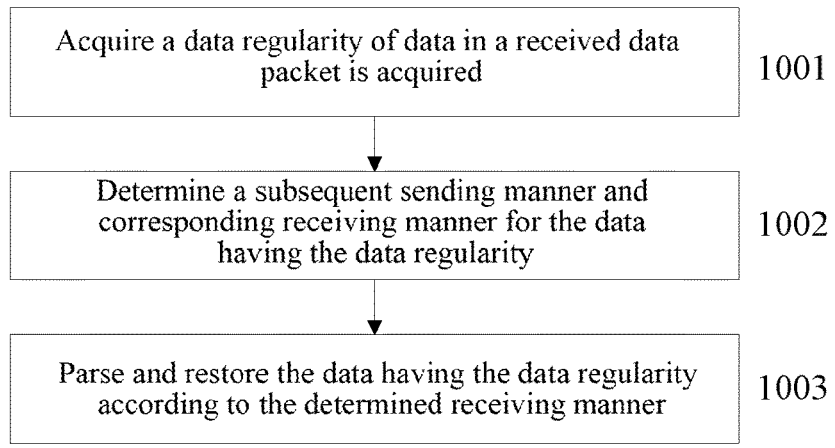
FIG. 10 is a flowchart of a method for data transmission in a wireless communication network according to an embodiment of the present disclosure.

FIG. 10 is a flowchart of a method for data transmission in a wireless communication network according to an embodiment of the present disclosure. As shown in FIG. 10, the method embodiment includes the following steps 1001-1003.

In step 1001, a data regularity of data in a received data packet is acquired.

In step 1002, a subsequent sending manner and corresponding receiving manner for the data having the data regularity are determined.

In step 1003, the data having the data regularity is parsed and restored according to the determined receiving manner.

According to the method provided by the embodiment of the present disclosure, the data regularity is acquired, and the sending and receiving manners for the data having the data regularity are determined to achieve a purpose of reducing the number of sending times of small data and improve utilization efficiency of wireless resources for small data transmission.

Figure 11:
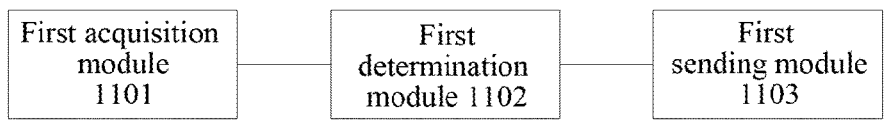
FIG. 11 is a structure diagram of a device for data transmission in a wireless communication network according to an embodiment of the present disclosure.

FIG. 11 is a structure diagram of a device for data transmission in a wireless communication network according to an embodiment of the present disclosure. As shown in FIG. 11, the device includes a first acquisition module 1101, a first determination module 1102 and a first determination module 1103.

The first acquisition module 1101 is configured to acquire a data regularity of data in a transmitted data packet.

The first determination module 1102 is configured to determine a subsequent sending manner and corresponding receiving manner for the data having the data regularity.

The first sending module 1103 is configured to send the data having the data regularity according to the determined sending manner.

The first determination module determines the data regularity in the following manner, and the manner includes: detecting and making statistics on a data packet to be transmitted generated in the past to acquire the data regularity; or, receiving a statistical result from a receiving end node, and acquiring the data regularity from the statistical result. The statistical result sent by the receiving end node is acquired by making statistics on a data packet which has been received by the receiving end node; or, receiving parameter information sent by an application layer, and acquiring the data regularity according to the parameter information.

The first determination module is configured to, receive parameter information sent by a local application layer; or, receive parameter information sent by the receiving end node. The parameter information is acquired by the receiving end node from the application layer.

The data regularity includes a repetition regularity or a numerical value change regularity.

The repetition regularity is acquired in the following manner.

If a repetition probability of the data packet reaches a preset threshold value or a repetition probability of a part of data of the data packet reaches a preset threshold value, it is determined that the data packet or the part of data of the data packet conforms to the repetition regularity, and the data packet or the part of data of the data packet meeting the threshold value is identified as a first type of optimizable data. A statistical way for the repetition probability includes: a total number of repetition times in a preset time period, or a total number of continuous repetition times.

The numerical value change regularity includes an arithmetic progression regularity, a geometric progression regularity, a periodic sequence regularity and an index series regularity.

The numerical value change regularity is preset by the sending end node or the receiving end node in advance; or, the numerical value change regularity is added by the sending end node and the receiving end node as required. Then, the data meeting the numerical value change regularity is identified as a second type of optimizable data of.

The subsequent sending manner and corresponding receiving manner for the data having the data regularity include: at least one of a first sending and receiving rule, a second sending and receiving rule and a third sending and receiving rule.

The first sending and receiving rule includes that: the sending end node is not required to request to the receiving end node for an uplink resource for sending the data having the data regularity, and is also not required to send the data having the data regularity on an available uplink resource, and the receiving end node acquires a content corresponding to the data having the data regularity; or, the sending end node is only required to send to the receiving end node a remaining part, except for the data having the data regularity, of data to be transmitted, and the receiving end node acquires the content corresponding to the data having the data regularity and fills the data packet sent by the sending end node with the acquired content.

The second sending and receiving rule includes that: if a data packet to be transmitted is the data having the data regularity or a part of the data packet to be transmitted is the data having the data regularity, the sending end node allocates a unique corresponding temporary replacement code to each kind of data having the data regularity, replaces the data having the data regularity with the corresponding temporary replacement code and sends to the receiving end node; and the receiving end node replaces the temporary replacement code with a content corresponding to the temporary replacement code.

The third sending and receiving rule includes that: the sending end node is not required to request to the receiving end node for the uplink resource for sending the data having the data regularity, and is also not required to send the data having the data regularity on the available uplink resource; and the receiving end node acquires the data regularity to which the data having the data regularity conforms and calculates to acquire the content of the data packet sent by the sending end node according to the data regularity; or, the sending end node is only required to send to the receiving end node the remaining part, except for the data having the data regularity, of the data to be transmitted; and the receiving end node acquires the data regularity to which the data having the data regularity conforms, calculates to acquire the content in the data packet sent by the sending end node according to the data regularity and fills the data packet sent by the sending end node with the content acquired by calculating.

The first sending and receiving rule and/or the third sending and receiving rule further include/includes that: when only the remaining part, except for the data having the data regularity, of the data packet to be transmitted is required to be sent to the receiving end node, the receiving end node is notified of the current data including the data having the data regularity and a position of the data having the data regularity in the data packet. A notification manner includes: notifying through a dedicated signaling or through a MAC header, or notifying by appending an indication in the sent data.

The temporary replacement code is defined by the sending end node or receiving end node of the data packet to be transmitted, or, is determined by mutual negotiation of the sending end node and the receiving end node.

A sending way for the temporary replacement code includes: sending through a control channel; or, sending through a dedicated data channel. The dedicated data channel is a data channel configured for the sending end node by the receiving end node and dedicated to replacement code sending; or, sending through a shared data channel. The shared data channel is a non-dedicated data channel configured to transmit any user-plane data, and a resource in the shared data channel is temporarily configured for the sending end node only when the sending end node has a requirement for transmitting the replacement code.

The first determination module includes a first determination unit and a second determination unit.

The first determination unit is configured to determine a type of optimizable data corresponding to the data having the data regularity.

The second determination unit is configured to determine the subsequent sending manner and corresponding receiving manner for the data having the data regularity according to the type of the optimizable data.

A sending manner and corresponding receiving manner corresponding to the first type of the optimizable data adopt the first sending and receiving rule and/or the second sending and receiving rule; and a sending manner and corresponding receiving manner corresponding to the second type of the optimizable data adopt the third sending and receiving rule.

The subsequent sending manner and corresponding receiving manner for the data having the data regularity are acquired in the following manner, which includes: the sending end node determines the subsequent sending manner and corresponding receiving manner for the data having the data regularity; or, the sending end node receives from the receiving end node the subsequent sending manner and corresponding receiving manner for the data having the data regularity determined by the receiving end node.

The device further includes: a second sending module, which is configured to send at least one of the following information to the receiving end node. The information includes the subsequent sending manner and corresponding receiving manner for the data having the data regularity; and description information of the data having the data regularity.

The device further includes: a third sending module, which is configured to, when the sending end node is a core network node, send the subsequent sending manner and corresponding receiving manner for the data having the data regularity and the description information of the data having the data regularity to an access network node which establishes a connection with the receiving end node.

The description information of the data having the data regularity includes: a content of the optimizable data, a type of the optimizable data or a data regularity to which the second type of the optimizable data conforms.

The description information of the data having the data regularity further includes at least one of: a position in the current data packet, an offset position of the second type of the optimizable data in a sequence which conforms to the data regularity, a service data source, a data sending period of the service data source, a service type and an equipment type.

According to the device provided by the embodiment of the present disclosure, the data regularity is acquired, and the sending and receiving manners for the data having the data regularity are determined to achieve a purpose of reducing the number of sending times of small data and improve utilization efficiency of wireless resources for small data transmission.

Figure 12:
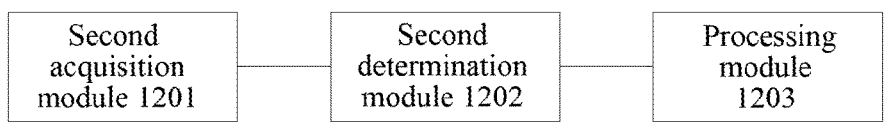
FIG. 12 is a structure diagram of a device for data transmission in a wireless communication network according to an embodiment of the present disclosure.

FIG. 12 is a structure diagram of a device for data transmission in a wireless communication network according to an embodiment of the present disclosure. As shown in FIG. 12, the device includes a second acquisition module 1201, a second determination module 1202 and a processing module 1203.

The second acquisition module 1201 is configured to acquire a data regularity of data in a received data packet.

The second determination module 1202 is configured to determine a subsequent sending manner and corresponding receiving manner for the data having the data regularity.

The processing module 1203 is configured to parse and restore the data having the data regularity according to the determined receiving manner.

The data regularity is acquired in the following manner. The received data packet is detected and made statistics to acquire the data regularity; or, a statistical result is received from a sending end node, and the data regularity is acquired from the statistical result. The statistical result sent by the sending end node is acquired by making statistics on the transmitted data packet by the sending end node; or, parameter information sent by an application layer is received, and the data regularity is acquired according to the parameter information.

The second determination module is configured to, receive parameter information sent by a local application layer; or, receive parameter information sent by the sending end node. The parameter information is acquired by the sending end node from the application layer.

The data regularity includes a repetition regularity or a numerical value change regularity.

The repetition regularity is acquired in the following manner. If a repetition probability of the data packet reaches a preset threshold value or a repetition probability of a part of data of the data packet reaches a preset threshold value, it is determined that the data packet or the part of data of the data packet conforms to the repetition regularity, and the data packet or the part of data of the data packet meeting the threshold value is identified as a first type of optimizable data. A statistical way for the repetition probability includes: a total number of repetition times in a preset time period, or a total number of continuous repetition times.

The numerical value change regularity includes an arithmetic progression regularity, a geometric progression regularity, a periodic sequence regularity and an index series regularity.

The data regularity is preset by the sending end node or the receiving end node in advance; or, the data regularity is added by the sending end node and the receiving end node as required. The data meeting the numerical value change regularity is identified as a second type of optimizable data.

The subsequent sending manner and corresponding receiving manner for the data having the data regularity include: at least one of a first sending and receiving rule, a second sending and receiving rule and a third sending and receiving rule.

The first sending and receiving rule includes that: the sending end node is not required to request to the receiving end node for an uplink resource for sending the data having the data regularity, and is also not required to send the data having the data regularity on an available uplink resource, and the receiving end node acquires a content corresponding to the data having the data regularity, or, the sending end node is only required to send to the receiving end node a remaining part, except for the data having the data regularity, of data to be transmitted, and the receiving end node acquires the content corresponding to the data having the data regularity and fills the data packet sent by the sending end node with the acquired content.

The second sending and receiving rule includes that: if a data packet to be transmitted is the data having the data regularity or part of the data packet to be transmitted is the data having the data regularity, the sending end node allocates a unique corresponding temporary replacement code to each kind of data having a data regularity, replaces the data having the data regularity with the corresponding temporary replacement code to send to the receiving end node, and the receiving end node replaces the temporary replacement code in the data packet sent by the sending end node with a content corresponding to the temporary replacement code.

The third sending and receiving rule includes that: the sending end node is not required to request to the receiving end node for the uplink resource for sending the data having the data regularity, and is also not required to send the data having the data regularity on the available uplink resource, and the receiving end node acquires the data regularity to which the data having the data regularity conforms and calculates to acquire a content of the data packet sent by the sending end node according to the data regularity, or, the sending end node is only required to send to the receiving end node the remaining part, except for the data having the data regularity, of the data to be transmitted, and the receiving end node acquires the data regularity to which the data having the data regularity conforms, calculates to acquire the content in the data packet sent by the sending end node according to the data regularity and fills the data packet sent by the sending end node with the acquired calculation result.

The second determination module includes a third determination unit and a fourth determination unit.

The third determination unit is configured to determine a type of optimizable data corresponding to the data having the data regularity.

The fourth determination unit is configured to determine the subsequent sending manner and corresponding receiving manner for the data having the data regularity according to the type of the optimizable data.

A sending manner and corresponding receiving manner corresponding to the first type of the optimizable data adopt the first sending and receiving rule and/or the second sending and receiving rule; and a sending manner and corresponding receiving manner corresponding to the second type of the optimizable data adopt the third sending and receiving rule.

The subsequent sending manner and corresponding receiving manner for the data having the data regularity are determined in the following manner, which includes: the receiving end node determines the subsequent sending manner and corresponding receiving manner for the data having the data regularity; or, the receiving end node receives from the sending end node the subsequent sending manner and corresponding receiving manner for the data having the data regularity determined by the sending end node.

The device further includes: a fourth sending module, which is configured to send at least one of the following information to the sending end node. The information includes: the subsequent sending manner and corresponding receiving manner for the data having the data regularity; and description information of the data having the data regularity.

The description information of the data having the data regularity includes: a content of the optimizable data, a type of the optimizable data or a data regularity to which the second type of the optimizable data conforms.

The description information of the data having the data regularity further includes at least one of: a position in the current data packet, an offset position of the second type of the optimizable data in a sequence which conforms to the data regularity, a service data source, a data sending period of the service data source, a service type and an equipment type.

The device further includes: a fifth sending module, which is configured to, when the receiving end node is a core network node, send by the core network node the subsequent sending manner and corresponding receiving manner for the data having the data regularity and the description information of the data having the data regularity to an access network node which establishes a connection with the sending end node.

According to the device provided by the embodiment of the present disclosure, the data regularity is acquired, and the sending and receiving manners for the data having the data regularity are determined to achieve a purpose of reducing the number of sending times of small data and improve utilization efficiency of wireless resources for small data transmission.

Those skilled in the art should know that all or part of the steps of the abovementioned embodiments may be implemented by a flow of a computer program, the computer program may be stored in a computer-readable storage medium, the computer program is executed on a corresponding hardware platform (such as a system, equipment, a device and an apparatus), and during execution, one or combination of the steps of the method embodiments is included.

In an exemplary embodiment, all or part of the steps of the abovementioned embodiments may also be implemented by an integrated circuit, and these steps may form each integrated circuit module respectively, or multiple modules or steps therein may form a single integrated circuit module for implementation. Each device/function module/function unit in the abovementioned embodiments may be implemented by adopting a universal computing device, and they may be concentrated on a single computing device, and may also be distributed on a network formed by multiple computing devices.

When being implemented in form of software function module and sold or used as an independent product, each device/function module/function unit in the abovementioned embodiments may be stored in a computer-readable storage medium. The abovementioned computer-readable storage medium may be a read-only memory, a magnetic disk, an optical disk or the like.

INDUSTRIAL APPLICABILITY

According to the embodiments provided by the present disclosure, the data regularity is acquired, and the sending and receiving manners for the data having the data regularity are determined to achieve a purpose of reducing the number of sending times of small data and improve utilization efficiency of wireless resources for small data transmission.

What is claimed is:

1. A method for data transmission in a wireless communication network, comprising:
   acquiring a data regularity of data in a transmitted data packet;
   determining a subsequent sending manner and corresponding receiving manner for the data having the data regularity; and
   sending the data having the data regularity according to the determined sending manner;
   wherein the subsequent sending manner and corresponding receiving manner for the data having the data regularity comprise: at least one of a first sending and receiving rule, a second sending and receiving rule and a third sending and receiving rule;
   wherein the first sending and receiving rule comprises that:
      a sending end node is not required to request to a receiving end node for an uplink resource for sending the data having the data regularity, and is also not required to send the data having the data regularity on an available uplink resource; and the receiving end node acquires a content corresponding to the data having the data regularity; or,
      the sending end node is only required to send to the receiving end node a remaining part, except for the data having the data regularity, of data to be transmitted, and the receiving end node acquires the content corresponding to the data having the data regularity and fills the data packet sent by the sending end node with the acquired content;
   wherein the second sending and receiving rule comprises that:
      if the data packet to be transmitted is the data having the data regularity or a part of the data packet to be transmitted is the data having the data regularity, the sending end node allocates a unique corresponding temporary replacement code to each kind of data having the data regularity, replaces the data having the data regularity with the corresponding temporary replacement code and sends to the receiving end node; and the receiving end node replaces the temporary replacement code with a content corresponding to the temporary replacement code;

wherein the third sending and receiving rule comprises that:
the sending end node is not required to request to the receiving end node for the uplink resource for sending the data having the data regularity, and is also not required to send the data having the data regularity on the available uplink resource; and the receiving end node acquires the data regularity to which the data having the data regularity conforms, and calculates to acquire the content of the data packet sent by the sending end node according to the data regularity; or, the sending end node is only required to send to the receiving end node the remaining part, except for the data having the data regularity, of the data to be transmitted; and the receiving end node acquires the data regularity to which the data having the data regularity conforms, calculates to acquire the content in the data packet sent by the sending end node according to the data regularity, and fills the data packet sent by the sending end node with the content acquired by calculating.

2. The method according to claim 1, wherein the data regularity comprises a repetition regularity or a numerical value change regularity;
wherein the repetition regularity is acquired in the following manner: if a repetition probability of the data packet reaches a preset threshold value or a repetition probability of a part of data of the data packet reaches a preset threshold value, determining that the data packet or the part of data of the data packet conforms to the repetition regularity, and identifying the data packet or the part of data of the data packet meeting the threshold value as a first type of optimizable data; wherein a statistical way for the repetition probability comprises: a total number of repetition times in a preset time period, or a total number of continuous repetition times;
wherein the numerical value change regularity comprises an arithmetic progression regularity, a geometric progression regularity, a periodic sequence regularity and an index series regularity; the numerical value change regularity is preset by a sending end node or a receiving end node in advance; or, the numerical value change regularity is added by the sending end node and the receiving end node as required; wherein data meeting the numerical value change regularity is identified as a second type of optimizable data.

3. The method according to claim 1, wherein the temporary replacement code is defined by the receiving end node or the sending end node of the data packet to be transmitted, or is determined by mutual negotiation of the sending end node and the receiving end node;
wherein a sending way for the temporary replacement code comprises: sending through a control channel; or, sending through a dedicated data channel, wherein the dedicated data channel is a data channel configured for the sending end node by the receiving end node and dedicated to replacement code sending; or, sending through a shared data channel, wherein the shared data channel is a non-dedicated data channel configured to transmit any user-plane data, and a resource in the shared data channel is temporarily configured for the sending end node only when the sending end node has a requirement for transmitting the replacement code.

4. The method according to claim 1, wherein, after determining the subsequent sending manner and corresponding receiving manner for the data having the data regularity, the method further comprises:
sending at least one of the following information to a receiving end node, comprising: the subsequent sending manner and corresponding receiving manner for the data having the data regularity; and description information of the data having the data regularity;
wherein the description information of the data having the data regularity comprises: a content of an optimizable data, a type of the optimizable data, or a data regularity to which a second type of the optimizable data conforms;
wherein the description information of the data having the data regularity further comprises at least one of: a position in the current data packet, an offset position of the second type of the optimizable data in a sequence which conforms to the data regularity, a service data source, a data sending period of the service data source, a service type and an equipment type.

5. A method for data transmission in a wireless communication network, comprising:
acquiring a data regularity of data in a received data packet;
determining a subsequent sending manner and corresponding receiving manner for the data having the data regularity; and
parsing and restoring the data having the data regularity according to the determined receiving manner;
wherein the subsequent sending manner and corresponding receiving manner for the data having the data regularity comprise: at least one of a first sending and receiving rule, a second sending and receiving rule and a third sending and receiving rule;
wherein the first sending and receiving rule comprises that:
a sending end node is not required to request to a receiving end node for an uplink resource for sending the data having the data regularity, and is also not required to send the data having the data regularity on an available uplink resource; and the receiving end node acquires a content corresponding to the data having the data regularity; or, the sending end node is only required to send to the receiving end node a remaining part, except for the data having the data regularity, of data to be transmitted, and the receiving end node acquires the content corresponding to the data having the data regularity and fills the data packet sent by the sending end node with the acquired content;

wherein the second sending and receiving rule comprises that:
if the data packet to be transmitted is the data having the data regularity or a part of the data packet to be transmitted is the data having the data regularity, the sending end node allocates a unique corresponding temporary replacement code to each kind of data having the data regularity, replaces the data having the data regularity with the corresponding temporary replacement code and sends to the receiving end node; and the receiving end node replaces the temporary replacement code with a content corresponding to the temporary replacement code;
wherein the third sending and receiving rule comprises that:
the sending end node is not required to request to the receiving end node for the uplink resource for sending the data having the data regularity, and is also not required to send the data having the data regularity on the available uplink resource; and the receiving end node acquires the data regularity to which the data having the data regularity conforms, and calculates to acquire the content of the data packet sent by the sending end node according to the data regularity; or,
the sending end node is only required to send to the receiving end node the remaining part, except for the data having the data regularity, of the data to be transmitted; and the receiving end node acquires the data regularity to which the data having the data regularity conforms, calculates to acquire the content in the data packet sent by the sending end node according to the data regularity, and fills the data packet sent by the sending end node with the content acquired by calculating.

6. The method according to claim 5, wherein the data regularity comprises a repetition regularity or a numerical value change regularity;
wherein the repetition regularity is acquired in the following manner: if a repetition probability of the data packet reaches a preset threshold value or a repetition probability of a part of data of the data packet reaches a preset threshold value, determining that the data packet or the part of data of the data packet conforms to the repetition regularity, and identifying the data packet or the part of data of the data packet meeting the threshold value as a first type of optimizable data; wherein a statistical way for the repetition probability comprises: a total number of repetition times in a preset time period, or a total number of continuous repetition times;
wherein the numerical value change regularity comprises an arithmetic progression regularity, a geometric progression regularity, a periodic sequence regularity and an index series regularity; the numerical value change regularity is preset by a sending end node or a receiving end node in advance; or, the numerical value change regularity is added by the sending end node and the receiving end node as required; wherein data meeting the numerical value change regularity is identified as a second type of optimizable data.

7. The method according to claim 5, wherein, after determining the subsequent sending manner and corresponding receiving manner for the data having the data regularity, the method further comprises:
sending at least one of the following information to a sending end node, comprising: the subsequent sending manner and corresponding receiving manner for the data having the data regularity; and description information of the data having the data regularity;
wherein the description information of the data having the data regularity comprises: a content of an optimizable data, a type of the optimizable data, or a data regularity to which a second type of the optimizable data conforms;
wherein the description information of the data having the data regularity further comprises at least one of: a position in the current data packet, an offset position of the second type of the optimizable data in a sequence which conforms to the data regularity, a service data source, a data sending period of the service data source, a service type and an equipment type.

8. A device for data transmission in a wireless communication network, comprising a processor and a storage device, wherein the storage device stores processor-executable programs, and the programs comprise a first acquisition module and a first determination module and a first sending module, wherein:
the first acquisition module is configured to acquire a data regularity of data in a transmitted data packet;
the first determination module is configured to determine a subsequent sending manner and corresponding receiving manner for the data having the data regularity; and
the first sending module is configured to send the data having the data regularity according to the determined sending manner;
wherein the subsequent sending manner and corresponding receiving manner for the data having the data regularity comprise: at least one of a first sending and receiving rule, a second sending and receiving rule and a third sending and receiving rule;
wherein the first sending and receiving rule comprises that:
a sending end node is not required to request to a receiving end node for an uplink resource for sending the data having the data regularity, and is also not required to send the data having the data regularity on an available uplink resource; and the receiving end node acquires a content corresponding to the data having the data regularity; or,
the sending end node is only required to send to the receiving end node a remaining part, except for the data having the data regularity, of data to be transmitted, and the receiving end node acquires the content corresponding to the data having the data regularity and fills the data packet sent by the sending end node with the acquired content;
wherein the second sending and receiving rule comprises that:
if the data packet to be transmitted is the data having the data regularity or a part of the data packet to be transmitted is the data having the data regularity, the sending end node allocates a unique corresponding temporary replacement code to each kind of data having the data regularity, replaces the data having the data regularity with the corresponding temporary replacement code and sends to the receiving end node; and the receiving end node replaces the temporary replacement code with a content corresponding to the temporary replacement code;
wherein the third sending and receiving rule comprises that:
the sending end node is not required to request to the receiving end node for the uplink resource for sending the data having the data regularity, and is also not required to send the data having the data regularity on the available uplink resource; and the receiving end node acquires the data regularity to which the data having the data regularity conforms, and calculates to acquire the content of the data packet sent by the sending end node according to the data regularity; or,
the sending end node is only required to send to the receiving end node the remaining part, except for the data having the data regularity, of the data to be transmitted; and the receiving end node acquires the data regularity to which the data having the data regularity conforms, calculates to acquire the content in the data packet sent by the sending end node according to the data regularity, and fills the data packet sent by the sending end node with the content acquired by calculating.

9. The device according to claim 8, wherein the data regularity comprises a repetition regularity or a numerical value change regularity;
- wherein the repetition regularity is acquired in the following manner: if a repetition probability of the data packet reaches a preset threshold value or a repetition probability of a part of data of the data packet reaches a preset threshold value, determining that the data packet or the part of data of the data packet conforms to the repetition regularity, and identifying the data packet or the part of data of the data packet meeting the threshold value as a first type of optimizable data;
- wherein a statistical way for the repetition probability comprises: a total number of repetition times in a preset time period, or a total number of continuous repetition times;
- wherein the numerical value change regularity comprises an arithmetic progression regularity, a geometric progression regularity, a periodic sequence regularity and an index series regularity; the numerical value change regularity is preset by a sending end node or a receiving end node in advance; or, the numerical value change regularity is added by the sending end node and the receiving end node as required; wherein data meeting the numerical value change regularity is identified as a second type of optimizable data.

10. The device according to claim 8, wherein the temporary replacement code is defined by the receiving end node or the sending end node of the data packet to be transmitted, or is determined by mutual negotiation of the sending end node and the receiving end node;
- wherein a sending way for the temporary replacement code comprises: sending through a control channel; or, sending through a dedicated data channel, wherein the dedicated data channel is a data channel configured for the sending end node by the receiving end node and dedicated to replacement code sending; or, sending through a shared data channel, wherein the shared data channel is a non-dedicated data channel configured to transmit any user-plane data, and a resource in the shared data channel is temporarily configured for the sending end node only when the sending end node has a requirement for transmitting the replacement code.

11. A device for data transmission in a wireless communication network, comprising a processor and a storage device, wherein the storage device stores processor-executable programs, and the programs comprise an acquisition module, a determination module and a processing module, wherein
- the acquisition module is configured to acquire a data regularity of data in a received data packet;
- the determination module is configured to determine a subsequent sending manner and corresponding receiving manner for the data having the data regularity; and
- the processing module is configured to parse and restore the data having the data regularity according to the determined receiving manner;
- wherein the subsequent sending manner and corresponding receiving manner for the data having the data regularity comprise: at least one of a first sending and receiving rule, a second sending and receiving rule and a third sending and receiving rule;
- wherein the first sending and receiving rule comprises that:
  - a sending end node is not required to request to a receiving end node for an uplink resource for sending the data having the data regularity, and is also not required to send the data having the data regularity on an available uplink resource; and the receiving end node acquires a content corresponding to the data having the data regularity; or,
  - the sending end node is only required to send to the receiving end node a remaining part, except for the data having the data regularity, of data to be transmitted, and the receiving end node acquires the content corresponding to the data having the data regularity and fills the data packet sent by the sending end node with the acquired content;
- wherein the second sending and receiving rule comprises that:
  - if the data packet to be transmitted is the data having the data regularity or a part of the data packet to be transmitted is the data having the data regularity, the sending end node allocates a unique corresponding temporary replacement code to each kind of data having the data regularity, replaces the data having the data regularity with the corresponding temporary replacement code and sends to the receiving end node; and the receiving end node replaces the temporary replacement code with a content corresponding to the temporary replacement code;
- wherein the third sending and receiving rule comprises that:
  - the sending end node is not required to request to the receiving end node for the uplink resource for sending the data having the data regularity, and is also not required to send the data having the data regularity on the available uplink resource; and the receiving end node acquires the data regularity to which the data having the data regularity conforms, and calculates to acquire the content of the data packet sent by the sending end node according to the data regularity; or,
  - the sending end node is only required to send to the receiving end node the remaining part, except for the data having the data regularity, of the data to be transmitted; and the receiving end node acquires the data regularity to which the data having the data regularity conforms, calculates to acquire the content in the data packet sent by the sending end node according to the data regularity, and fills the data packet sent by the sending end node with the content acquired by calculating.

12. The device according to claim 11, wherein the data regularity comprises a repetition regularity or a numerical value change regularity;
- wherein the repetition regularity is acquired in the following manner: if a repetition probability of the data packet reaches a preset threshold value or a repetition probability of a part of data of the data packet reaches a preset threshold value, determining that the data packet or the part of data of the data packet conforms to the repetition regularity, and identifying the data packet or the part of data of the data packet meeting the threshold value as a first type of optimizable data;
- wherein a statistical way for the repetition probability comprises: a total number of repetition times in a preset time period, or a total number of continuous repetition times;

wherein the numerical value change regularity comprises an arithmetic progression regularity, a geometric progression regularity, a periodic sequence regularity and an index series regularity; the numerical value change regularity is preset by a sending end node or a receiving end node in advance; or, the numerical value change regularity is added by the sending end node and the receiving end node as required; wherein data meeting the numerical value change regularity is identified as a second type of optimizable data.

\* \* \* \* \*